US012639791B2

(12) United States Patent
Nagare et al.

(10) Patent No.: US 12,639,791 B2
(45) Date of Patent: May 26, 2026

(54) IMAGE ENHANCEMENT USING TEXTURE MATCHING GENERATIVE ADVERSARIAL NETWORKS

(71) Applicants: GE Precision Healthcare LLC, Wauwatosa, WI (US); Purdue Research Foundation, West Lafayette, IN (US); University of Notre Dame du Lac, South Bend, IN (US)

(72) Inventors: Madhuri Mahendra Nagare, West Lafayette, IN (US); Roman Melnyk, New Berlin, WI (US); Brian Nett, Wauwatosa, WI (US); Ken D. Sauer, South Bend, IN (US); Gregery T. Buzzard, West Lafayette, IN (US); Charles A. Bouman, Jr., West Lafayette, IN (US)

(73) Assignees: GE Precision Healthcare LLC, Waukesha, WI (US); Purdue Research Foundation, West Lafayette, IN (US); University of Notre Dame du Lac, South Bend, IN (US)

( * ) Notice: Subject to any disclaimer, the term of this patent is extended or adjusted under 35 U.S.C. 154(b) by 427 days.

(21) Appl. No.: 18/475,609

(22) Filed: Sep. 27, 2023

(65) Prior Publication Data

US 2024/0119567 A1 Apr. 11, 2024

Related U.S. Application Data

(60) Provisional application No. 63/410,486, filed on Sep. 27, 2022.

(51) Int. Cl.
*G06T 5/50* (2006.01)
*G06T 5/70* (2024.01)
(Continued)

(52) U.S. Cl.
CPC .................. *G06T 5/50* (2013.01); *G06T 5/70* (2024.01); *G06T 5/73* (2024.01); *G06T 11/006* (2013.01);
(Continued)

(58) Field of Classification Search
CPC ......... G06T 11/006; G06T 2207/10081; G06T 2207/20081; G06T 2211/441; G06T 5/50; G06T 5/70; G06T 5/73
(Continued)

(56) References Cited

U.S. PATENT DOCUMENTS

2011/0268328 A1 11/2011 Bar-Aviv et al.
2012/0219215 A1 8/2012 Lukac
(Continued)

OTHER PUBLICATIONS

You, Chenyu, et al. "CT Super-resolution GAN Constrained by the Identical, Residual, and Cycle Learning Ensemble (GAN-CIRCLE)." arXiv preprint arXiv:1808.04256 (2018). (Year: 2018).*
(Continued)

*Primary Examiner* — Chineyere Wills-Burns
*Assistant Examiner* — Emmanuel Silva-Avina
(74) *Attorney, Agent, or Firm* — Amin, Turocy & Watson, LLP

(57) ABSTRACT

One or more systems, devices, computer program products and/or computer-implemented methods of use provided herein relate to image enhancement using a generative adversarial network (GAN). The computer-implemented system can comprise a memory that can store computer-executable components. The computer-implemented system can further comprise a processor that can execute the computer-executable components stored in the memory, wherein the computer-executable components can comprise a training component that can train a discriminator of the GAN to score a texture of a CT image, wherein the texture can be
(Continued)

derived from a difference of two conditionally independent estimates produced by a generator of the GAN by respectively processing two independent noisy samples of images.

20 Claims, 16 Drawing Sheets
(8 of 16 Drawing Sheet(s) Filed in Color)

(51) Int. Cl.
    *G06T 5/73*         (2024.01)
    *G06T 11/00*      (2026.01)
(52) U.S. Cl.
    CPC .............. *G06T 2207/10081* (2013.01); *G06T*
             *2207/20081* (2013.01); *G06T 2207/20084*
             (2013.01); *G06T 2211/441* (2023.08)
(58) Field of Classification Search
    USPC .......................................................... 382/157
    See application file for complete search history.

(56)             References Cited

U.S. PATENT DOCUMENTS

| | | |
|---|---|---|
| 2013/0202177 A1 | 8/2013 | Bar-Aviv et al. |
| 2020/0065940 A1 | 2/2020 | Tang et al. |
| 2020/0388014 A1 | 12/2020 | Hiasa |
| 2021/0118099 A1 | 4/2021 | Kearney et al. |
| 2022/0375038 A1 | 11/2022 | Nagare et al. |
| 2024/0062342 A1 | 2/2024 | Jangid et al. |

OTHER PUBLICATIONS

Huang, Zhizhong, et al. "DU-GAN: Generative adversarial networks with dual-domain U-Net-based discriminators for low-dose CT denoising." IEEE Transactions on Instrumentation and Measurement 71 (2021): 1-12. (Year: 2021).*

Bera, Sutanu, and Prabir Kumar Biswas. "Noise Conscious Training of Non Local Neural Network powered by Self Attentive Spectral Normalized Markovian Patch GAN for Low Dose CT Denoising." arXiv preprint arXiv:2011.05684 (2020). (Year: 2020).*

Cheng, Yifeng, and Zengli Liu. "Image denoising algorithm based on structure and texture part." 2016 12th International Conference on Computational Intelligence and Security (CIS). IEEE, 2016. (Year: 2016).*

Chi, Jianning, et al. "Single low-dose CT image denoising using a generative adversarial network with modified U-Net generator and multi-level discriminator." IEEE Access 8 (2020): 133470-133487. (Year: 2020).*

Yang, Qingsong, et al. "Low-dose CT image denoising using a generative adversarial network with Wasserstein distance and perceptual loss." IEEE transactions on medical imaging 37.6 (2018): 1348-1357. (Year: 2018).*

Tyler. Ch. W. et al. | "Beyond fourth-order texture discrimination: generation of extreme-order and statistically-balanced textures." Vision Research, 44(18):2187-2199, 2004, 13 pages.

Solomon, J. B. et al. | "Quantitative comparison of noise texture across CT scanners from different manufacturers." Medical physics, 39(10):6048-6055, 2012, 8 pages.

Nagare. M. et al. | "A bias-reducing loss function for CT image denoising." In ICASSP 2021—2021 IEEE International Conference on Acoustics, Speech and Signal Processing (ICASSP), pp. 1175-1179, 2021, doi: 10.1109/ICASSP39728.2021.9413855, 5 pages.

Nagare. M. et al. | "A noise preserving sharpening filter for CT image enhancement." In ICIP 2022—2022 IEEE International Conference on Image Processing (ICIP), 2022.

Gibson, J.J.. | "The perception of visual surfaces." The American journal of psychology, 63(3):367-384, 1950.

Jagadeesh, A.V. et al. | "Texture-like representation of objects in human visual cortex." Proceedings of the National Academy of Sciences, 119(17):e2115302119, 2022, DOI: https://doi.org/10.1073/pnas.2115302119, 13 pages.

Waite, St. et al. | "Analysis of perceptual expertise in radiology-current knowledge and a new perspective." Frontiers in human neuroscience, 13:213, published Jun. 25, 2019, doi: 10.3389/fnhum.2019.00213, 21 pages.

Kulathilake, K.A. et al. | "A review on self-adaptation approaches and techniques in medical image denoising algorithms." Multimedia Tools and Applications, vol. 81, Issue 26, Nov. 2022, pp. 37591-37626, https://doi.org/10.1007/s11042-022-13511-w.

Buades, A. et al. | "A non-local algorithm for image denoising." In 2005 IEEE Computer Society Conference on Computer Vision and Pattern Recognition (CVPR'05), vol. 2, pp. 60-65 vol. 2, 2005, 6 pages.

Li, Zh. et al. | "Adaptive nonlocal means filtering based on local noise level for CT denoising." Medical Physics, 41 (1):011908, published Dec. 31, 2013, doi: 10.1118/1.4851635, URL https://aapm.onlinelibrary.wiley.com/doi/abs/10.1118/1.4851635, 16 pages.

Dabov, K. et al. | "Image denoising by sparse 3-D transform-domain collaborative filtering." IEEE Transactions on Image Processing, vol. 16, No. 8, Aug. 2007, 16 pages.

Beister, M. et al. | "Iterative reconstruction methods in X-ray CT." Physica Medica, vol. 28, Issue 2, 2012, pp. 94-108, https://doi.org/10.1016/j.ejmp.2012.01.003, 15 pages.

Thibault, J.-B. et al. | "A three-dimensional statistical approach to improved image quality for multislice helical CT." Medical Physics, 34 (11), Nov. 2007, DOI: 10.1118/1.2789499, 19 pages.

Kang, E. et al. | "A deep convolutional neural network using directional wavelets for lowdose X-ray CT reconstruction." Medical Physics 44 (10), Oct. 2017, doi: 10.1002/mp.12344, 16 pages.

Dong, Ch. et al. | "Image super-resolution using deep convolutional networks." IEEE Transactions on Pattern Analysis and Machine Intelligence, 38(2):295-307, 2016. doi: 10.1109/TPAMI, 16 pages.

Chen, H. et al. | "Low-Dose CT With a Residual Encoder-Decoder Convolutional Neural Network," in IEEE Transactions on Medical Imaging, vol. 36, No. 12, pp. 2524-2535, Dec. 2017, doi: 10.1109/TMI.2017.2715284, 38 pages.

Wolterink, J. M. et al. | "Generative Adversarial Networks for Noise Reduction in Low-Dose CT," in IEEE Transactions on Medical Imaging, vol. 36, No. 12, pp. 2536-2545, Dec. 2017, doi: 10.1109/TMI.2017.2708987, 10 pages.

Yang, Q. et al.| "Low-Dose CT Image Denoising Using a Generative Adversarial Network With Wasserstein Distance and Perceptual Loss," in IEEE Transactions on Medical Imaging, vol. 37, No. 6, pp. 1348-1357, Jun. 2018, doi: 10.1109/TMI.2018.2827462, 10 pages.

Li, M. et al. | "SACNN: Self-Attention Convolutional Neural Network for Low-Dose CT Denoising With Self-Supervised Perceptual Loss Network," in IEEE Transactions on Medical Imaging, vol. 39, No. 7, pp. 2289-2301, Jul. 2020, doi: 10.1109/TMI.2020.2968472, 13 pages.

You, C. et al. | "CT Super-Resolution GAN Constrained by the Identical, Residual, and Cycle Learning Ensemble (GAN-CIRCLE)," in IEEE Transactions on Medical Imaging, vol. 39, No. 1, pp. 188-203, Jan. 2020, doi: 10.1109/TMI.2019.2922960, 14 pages.

Xian, W. et al. | "Texturegan: Controlling deep image synthesis with texture patches." In Proceedings of the IEEE conference on computer vision and pattern recognition, pp. 8456-8465, 2018, 10 pages.

Starck, J.-L. et al. | "Image decomposition via the combination of sparse representations and a variational approach," in IEEE Transactions on Image Processing, vol. 14, No. 10, pp. 1570-1582, Oct. 2005, doi: 10.1109/TIP.2005.852206, 13 pages.

Zeng, Y. et al. | "Magnetic resonance image denoising algorithm based on cartoon, texture, and residual parts." Computational and Mathematical Methods in Medicine, 2020, vol. 2020, Article ID 1405647, https://doi.org/10.1155/2020/1405647, 10 pages.

Chen, Y. et al. | "Image denoising algorithm based on structure and texture part." In 2016 12th International Conference on Computational Intelligence and Security (CIS), pp. 147-151. IEEE, 2016, 5 pages.

(56)　　　　　References Cited

OTHER PUBLICATIONS

Goodfellow, I. et al. | "Generative adversarial networks." In Advances in Neural Information Processing Systems, vol. 27, 2014, URL https://proceedings.neurips.cc/paper/2014/file/5ca3e9b122f61f8f06494c97b1afccf3-Paper.pdf, 9 pages.

Bromley, J. et al. | "Signature verification using a "siamese" time delay neural network." International Journal of Pattern Recognition and Artificial Intelligence, 7(4):669-688, 1993, 8 pages.

Ian Goodfellow, Yoshua Bengio, and Aaron Courville. Deep Learning. MIT Press, 2016. http://www.deeplearningbook.org.

Zhang, K. et al. | "Beyond a gaussian denoiser: Residual learning of deep cnn for image denoising." IEEE Transactions on Image Processing, 26(7):3142-3155, 2017, 13 pages.

Isola, Ph. et al. | "Image-to-image translation with conditional adversarial networks." In Proceedings of the IEEE Conference on Computer Vision and Pattern Recognition, pp. 1125-1134, 2017, 10 pages.

Hsieh, J. et al. | "A new era of image reconstruction: True-fidelity™." Technical white paper on deep learning image reconstruction, GE Healthcare, 2019, 15 pages.

Kingma, D. et al. | "Adam: A method for stochastic optimization." In 3rd International Conference on Learning Representations, ICLR 2015, URL http://arxiv.org/abs/1412.6980, 15 pages.

F. Chollet et al. Keras. https://keras.io, 2015.

J. Hsieh, Computed tomography: principles, design, artifacts, and recent advances, SPIE press, 3rd edition, 2015.

Ghalati, M.Kh. et al. | "Texture analysis and its applications in biomedical imaging: A survey," IEEE Reviews in Biomedical Engineering, vol. 15, pp. 222-246, 2022, 25 pages.

Melnyk et al., U.S. Appl. No. 17/807,779 titled "Noise Preserving Models and Methods for Resolution Recovery of X-Ray Computed Tomography Images" filed Jun. 20, 2022.

Cohen, J.P. et al. | "Distribution Matching Losses Can Hallucinate Features in Medical Image Translation," arXiv:1805.08841v3 [cs. CV] Oct. 3, 2018, 11 pages.

Arjovsky, M. et al. | "Wasserstein gen-erative adversarial networks," Proceedings of the 34 th International Conference on Machine Learning, Sydney, Australia, PMLR 70, 2017, 10 pages.

Wang, Z. et al. | "Image quality assessment: from error visibility to structural similarity," IEEE Transactions on Image Processing, vol. 13, No. 4, pp. 600-612, 2004, 14 pages.

Szczykutowicz, T.P. et al. | "A Review of Deep Learning CT Reconstruction: Concepts, Limitations, and Promise in Clinical Practice," Current Radiology Reports, vol. 10, No. 9, pp. 101-115, 2022, 15 pages.

Li et al., "Resolution and Noise Trade-off Analysis for Volumetric CT", Medical Physics, vol. 34, No. 10, Oct. 2007, pp. 3732-3738.

Jiang et al., "Blind Deblurring of Spiral CT Images", IEEE Transactions on Medical Imaging, vol. 22, No. 7, Jul. 2003, pp. 837-845.

Zhang et al., "Model-based Iterative Reconstruction for Dual-Energy X-ray CT Using a Joint Quadratic Likelihood Model", IEEE Transactions on Medical Imaging, vol. 33, No. 1, 2003, 18 pages.

Kuntz et al., "Focal Spot Deconvolution Using Convolutional Neural Networks", Proceedings of SPIE 10948, Physics of Medical Imaging, Mar. 1, 2019, doi: 10.1117/12.2513400, 7 pages.

Yim et al., "A Deep Convolutional Neural Network For Simultaneous Denoising and Deblurring in Computed Tomography", Journal of Instrumentation, vol. 15, No. 12, Dec. 1, 2020, 12 pages.

Chen et al., "Learning Blind Denoising Network for Noisy Image Deblurring", IEEE International Conference on Acoustics, Speech and Signal Processing, (ICASSP), May 2020, 5 pages.

Zhang et al., "Learning a Single Convolutional Super-resolution Network for Multiple Degradations", In Proceedings of the IEEE Conference on Computer Vision and Pattern Recognition, arXiv:1712.06116v2 Ics.CVI, May 24, 2018, 10 pages.

Chi et al., "Computed Tomography (CT) Image Quality Enhancement via a Uniform Framework Integrating Noise Estimation and Super-resolution Networks", Sensors, vol. 19, No. 3348, Jul. 30, 2019 doi:10.3390/s19153348, 20 pages.

Dong et al., "Image Deblurring and Super-resolution by Adaptive Sparse Domain Selection and Adaptive Regularization", IEEE Transactions on Image Processing, 20(7), 2011, 35 pages.

The Phantom Laboratory, "Catphan 700 Product Guide", The Phantom Laboratory, Oct. 1, 2021, 52 pages.

You et al., "CT Super-resolution Gan Constrained by the Identical, Residual, and Cycle Learning Ensemble [Gancircle]", asarXiv:1808.04256v3 [eess.IV], Sep. 6, 2018, 16 pages.

Non-Final Office Action received for U.S. Appl. No. 17/807,779, dated Sep. 29, 2024, 52 pages.

Notice of Allowance for U.S. Appl. No. 17/807,779, dated Jan. 23, 2025.

* cited by examiner

200

210

IMAGE ENHANCEMENT USING TEXTURE MATCHING GENERATIVE ADVERSARIAL NETWORKS

TECHNICAL FIELD

The subject disclosure relates generally to machine learning and, more specifically, to image enhancement using generative adversarial networks (GANs).

BACKGROUND

Radiologists have strong preferences for fine-grained uniform textures in computed tomography (CT) images, and different textures in CT images can show different statistical properties. Some existing approaches for preserving textural information in images can employ GANs to produce texture in enhanced images. However, such approaches do not provide quantitative evaluation of the texture produced and a comparison of the texture produced with a texture favorable to radiologists. Further, such approaches can involve feeding enhanced images comprising anatomy and texture to a discriminator of a generative adversarial network (GAN), which can potentially add inaccurate or even unreal image details, known as hallucinations, to the images, while denoising or sharpening the images.

Accordingly, systems or techniques that can produce texture-rich enhanced CT images can be desirable.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable image enhancement using GANs are discussed.

According to an embodiment, a system is provided. The system can comprise a memory that can store computer-executable components. The system can further comprise a processor that can execute the computer-executable components stored in the memory. The computer-executable components can comprise a training component that can train a discriminator of a GAN to score a texture of a CT image, wherein the texture can be derived from a difference of two conditionally independent estimates produced by a generator of the GAN by respectively processing two independent noisy samples of images.

According to another embodiment, a computer-implemented method is provided. The computer-implemented method can comprise training, by a device operatively coupled to a processor, a discriminator of a GAN to score a texture of a CT image, wherein the texture can be derived from a difference of two conditionally independent estimates produced by a generator of the GAN by respectively processing two independent noisy samples of images.

According to yet another embodiment, a computer program product for enhancing CT images using a texture matching generative adversarial network (TMGAN) is provided. The computer program product can comprise a non-transitory computer readable memory having program instructions embodied therewith. The program instructions can be executable by a processor to cause the processor to train a discriminator of a GAN to score a texture of a CT image, wherein the texture can be derived from a difference of two conditionally independent estimates produced by a generator of the GAN by respectively processing two independent noisy samples of images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
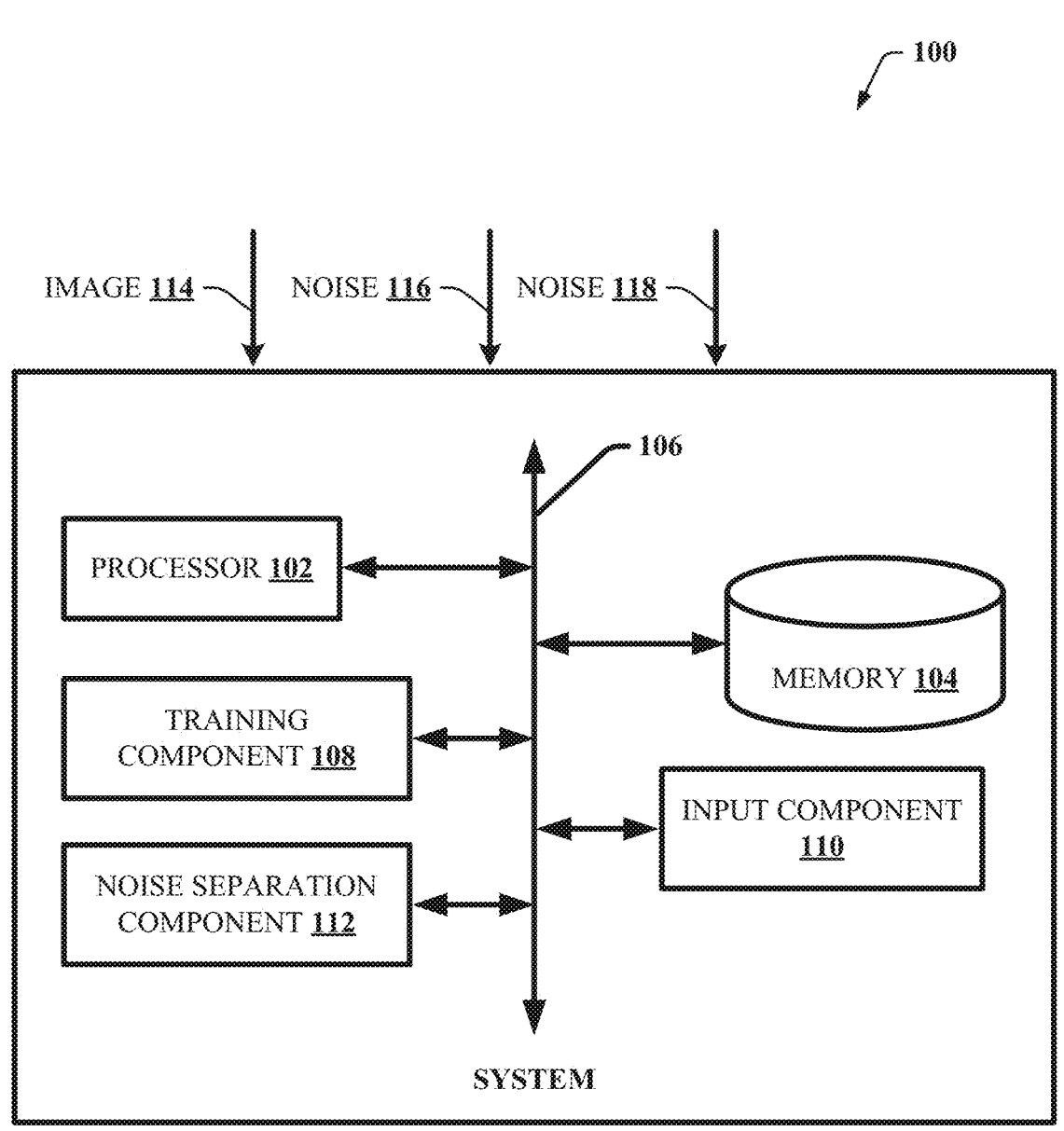
FIG. 1 illustrates a block diagram of an example, non-limiting system that can be employed for CT image enhancement using a TMGAN in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

X-ray CT is one of the most widely used three-dimensional (3D) medical imaging modalities, and over the past decade, significant progress has been made in the development of methods to further reduce noise and artifacts in medical images while improving resolution and quality. Noise reduction methods can offer an opportunity to reduce X-ray dosage while achieving similar image quality, whereas deblurring methods can improve image detail. For CT image enhancement, in addition to the noise level and image detail, textures of resulting images can play a key role, as these images are read by radiologists. Human perception of texture has been investigated widely in the literature. In addition to providing realistic perception, presence of desired texture can provide important visual cues in decision making for radiologists. For example, radiologists are familiar and comfortable with the traditional, filtered back projection (FBP)-like noise texture. As such, noise texture in CT reconstruction algorithms deployed in commercial scanners has been evaluated against FBP. Hence, it is desirable to produce and maintain FBP-like texture while denoising or sharpening CT images. For example, radiologists have a strong preference for fine-grained uniform texture in minimally processed CT images such as water phantom reconstructions with a basic standard filter. To quantify and evaluate noise texture in medical CT, an NPS is often employed. The NPS shows noise amplitude at increasing spatial frequencies. It is to be noted that even though FBP has desirable texture, it has higher noise level. Therefore, an ideal CT image enhancement algorithm needs to have the ability to reduce noise amplitude equally over all frequencies, while maintaining the shape of NPS as FBP.

Controlling texture quality in CT images can be a challenging problem. Given target texture images, some methods to synthesize high quality texture can comprise matching statistics of the target texture with those of the generated one. However, employing such methods while denoising or sharpening a CT image can require that the true anatomy be separated from the statistical texture. Some approaches can employ morphological component analysis (MCA) to separate anatomy or object parts from a texture. However, MCA also requires dictionary learning for both the object and texture components, which adds a difficult and computationally expensive step towards processing.

Adaptive methods have also been developed in the art to preserve textural information. For example, existing patch-based approaches using spatial similarity can employ parameters which control the regularization or smoothness achieved in the results. In other approaches, iterative reconstruction algorithms can provide good spatial resolution and noise reduction. Yet other approaches propose a prior distribution which can be fine tuned to preserve edge information and get better/more desirable texture in the results. However, iterative methods tend to be computationally expensive. Convolutional neural networks (CNNs) are among the most popular methods for CT image enhancement. While CNNs can be very effective, they typically require training with the choice of a loss function and training data. Particularly, the mean square error (MSE) loss function is commonly used for training because it results in a trained network that approximately maximizes the PSNR. However, the MSE loss function can tend to produce images that are overly smooth and lack texture. Generally, whenever a neural network is trained to denoise images or sharpen images, the neural network tends to produce over-smooth results due to having MSE as the loss function.

One approach to improving textural details in enhanced images can be the use of a GAN architecture for training. A common approach in existing GAN architectures for CT image enhancement is to input generator output, i.e., denoised or sharpened images, to the discriminator. Some existing GAN-based approaches can produce some texture in denoised and sharpened images. However, such existing GAN-based approaches do not provide quantitative evaluation of textures produced relative to textures found favorable by radiologists. Furthermore, feeding enhanced CT images with anatomy and texture to the discriminator can potentially add inaccurate or even unreal image details, known as hallucinations, since the discriminator can accept images from the distribution of ground truth images irrespective of their structural fidelity with respect to the input.

None of the above discussed approaches can produce texture that can match the statistics of a target texture sample. Some GAN-based approaches can involve methods that produce the desired texture in natural images if a sketch is provided. While training, such approaches perform fine-tuning by comparing the texture produced by the generator to the samples of the desired/target texture. However, such a method cannot be applied directly to the challenges presented herein with respect to medical image enhancement due to unavailability of sketches of anatomy. There is growing interest in the use of deep neural network (DNN)-based image denoising and sharpening to reduce X-ray dosages of patients in medical CT while maintaining the quality of reconstructions. For clinical applications, an effective algorithm can be required to retain a favorable texture while enhancing the images. The commonly used MSE loss function in the DNN training produces over-smooth images, and generative models can recover texture to some extent. However, such models can introduce inaccurate or even unreal image details (e.g., hallucinations).

Various embodiments of the present disclosure can address one or more of these problems by producing a desired distribution of texture in the results and separating texture from anatomical structures in images. In the various embodiments, systems, computer-implemented methods, and computer program products are presented that can enable matching texture in enhanced images to a desired texture, based on statistics of the desired texture. In various embodiments, a TMGAN can enhance (denoise and/or sharpen) CT images while simultaneously matching a texture resulting to examples of a target image texture. To alleviate the risk of hallucination in GANs for clinical applications, the TMGAN architecture can separate a clean CT image containing anatomical features from texture during training and match the texture to target example textures that can be taken from a small number of water phantom reconstructions. The TMGAN can achieve this by adding two independent noise samples to the same ground truth image and processing them with a Siamese network (e.g., the generator of the TMGAN) to produce two conditionally independent estimates. A difference of the two conditionally independent estimates can be generated to isolate the texture portion of the enhanced images, and the texture can be fed to the discriminator to compare against the target texture. Consequently, the generator can be trained to produce denoised or sharpened images with the target texture.

In various embodiments, the TMGAN can achieve favorable textural features quantitatively and qualitatively for clinical exams. In various embodiments, a denoising and deblurring algorithm can potentially reduce the X-ray dosage for patients. The TMGAN can produce uniform texture with good detail and fewer artifacts. It is to be appreciated that the TMGAN can be applicable to other types of images, including, magnetic resonance imaging (MRIs), positron emission tomography (PETs), etc.

Stated differently, the TMGAN can denoise and/or sharpen CT images while simultaneously matching the texture of the resulting output to a distribution of target textures. In various embodiments, this can be achieved by using a branched network with identical weights in each branch. Each branch can process ground truth corrupted by noise, with the noise realization being independent in the two branches. By considering a difference of the resulting outputs of the branched network, the TMGAN can separate texture from anatomy in images. By embedding the branched network in an adversarial training framework, the TMGAN can be trained to produce a desired texture layered on top of a clean image. The resulting output can be an enhanced CT image that can contain important physiological details and maintain a texture that can be viewed as desirable by practicing radiologists. The methods described in various embodiments herein can reduce a risk of hallucinations in medical images by separating a clean CT image containing anatomical features from texture and restricting generation to the texture part of the image. Furthermore, the bias-variance trade-off can be modulated as desired using a simple blending method. Experiments conducted in connection with the various embodiments can illustrate that the TMGAN can remove streaking or aliasing artifacts and produce images having a uniform texture while maintaining details.

In various embodiments, the TMGAN network architecture can denoise (sharpen) noisy (blurred) CT images while producing desired textures in image results. In various embodiments, the TMGAN framework can separate noisy texture from the estimated clean image by subtracting two conditionally independent estimates with the same ground truth. In various embodiments, a generative model can be employed to match texture produced in cleaned (sharpened) images to a desired texture, given example images of the desired texture. A quantitative evaluation of achieved texture using NPS for the applications of CT image denoising and deblurring was performed and has been described with reference to the figures.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1400 illustrated at FIG. 14. For example, system 100 can be associated with, such as accessible via, a computing environment 1400 described below

Figure 14:
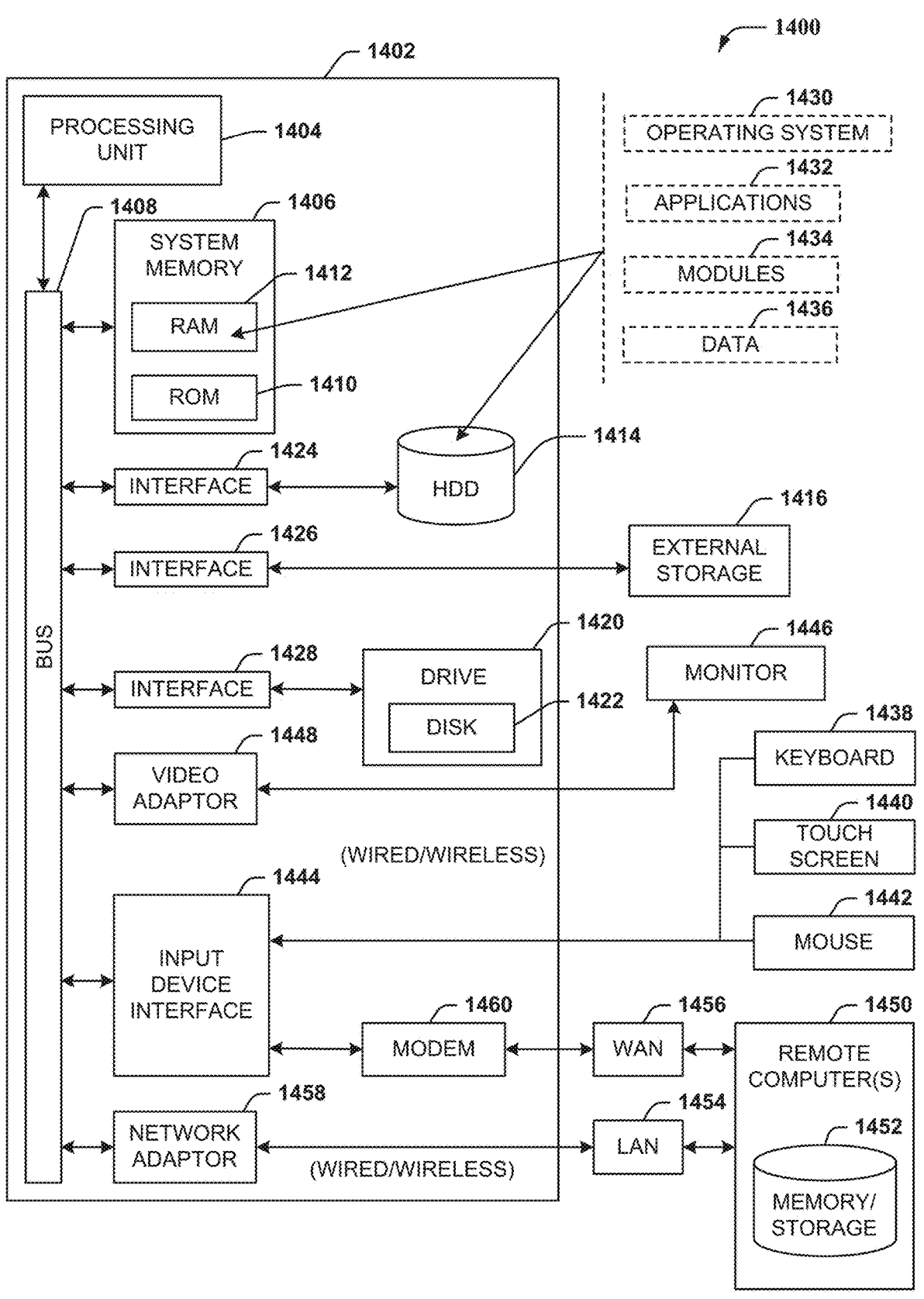
FIG. 14 illustrates a block diagram of an example, non-limiting operating environment in which one or more embodiments described herein can be facilitated.

6 with reference to FIG. 14, such that aspects of processing can be distributed between system 100 and the computing environment 1400. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can be employed for CT image enhancement using a TMGAN in accordance with one or more embodiments described herein.

System 100 and/or the components of system 100 can be employed to use hardware and/or software to solve problems that are highly technical in nature (e.g., related to GANs, enhancement of medical images, etc.), that are not abstract and that cannot be performed as a set of mental acts by a human. Further, some of the processes performed may be performed by specialized computers for carrying out defined tasks related to the enhancement of medical images. The system 100 and/or components of the system can be employed to solve new problems that arise through advancements in technologies mentioned above and/or the like. The system 100 can provide improvements in terms of a TMGAN network architecture that can produce denoised or deblurred CT images. The denoised or deblurred CT images can be produced while ensuring that hallucinations are absent from the denoised or deblurred CT images. To alleviate the risk of hallucinations in GANs for clinical applications, the TMGAN architecture can separate anatomical features from texture in a clean CT image during training and match the texture to a desired example texture that can be taken from a small number of water phantom reconstructions. As such, the TMGAN can produce images having a uniform texture and remove streaking or aliasing artifacts.

Discussion turns briefly to processor 102, memory 104 and bus 106 of system 100. For example, in one or more embodiments, system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a non-transitory computer-readable memory (e.g., memory 104) that can be operably connected to processor 102. Memory 104 can store computer-executable instructions that, upon execution by processor 102, can cause processor 102 and/or one or more other components of system 100 (e.g., training component 108, input component 110, and/or noise separation component 112) to perform one or more actions. In one or more embodiments, memory 104 can store computer-executable components (e.g., training component 108, input component 110, and/or noise separation component 112).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). For example, in various embodiments, training component 108 can train a discriminator of a GAN (e.g., TMGAN) to score a texture of image 114 (e.g., a CT image), wherein the texture can be derived from a difference of two conditionally independent estimates produced by a generator of the GAN by respectively processing two independent noisy samples of images. In various embodiments, input component 110 can add two different noise samples (e.g., noise 116 and noise 118) to the image 114 to generate the two independent noisy samples of images, wherein the two independent noisy samples of images can be conditionally independent. For example, the TMGAN can comprise a generator network comprising a Siamese network and a discriminator network. The TMGAN generator can produce CT images from a clean image, $x_k$, that can be an original CT image. $G(\cdot)$ can be a deformity developed for denoising and/or sharpening a CT image. For denoising applications, $G(\cdot)$ can be an identity operator, and for sharpening applications, $G(\cdot)$ can be a blurring operation. Input component 110 can add noise, $w_{k,1}$ (e.g., noise 116) and $w_{k,2}$ (e.g., noise 118), to the clean image, $x_k$, to respectively generate conditionally independent and identically distributed noisy images, $y_{k,1}$ and $y_{k,2}$, and the deformity $G(\cdot)$ can be blurred in addition to the noise. In various embodiments, $w_{k,1}$ and $w_{k,2}$, can be different samples of noisy images taken from the same distribution, and $w_{k,1}$ and $w_{k,2}$ can be added to the original image (e.g. image 114) pixel-by pixel and be superimposed on the original image. In various embodiments, $w_{k,1}$ and $w_{k,2}$, can be taken from different parts of a water phantom scan.

In various aspects, the discriminator can score the texture of the CT image against samples of a desired texture for the CT image during training, wherein scoring the texture of the CT image can comprise matching a distribution of noise in the texture with a desired noise. For example, multiple images of noisy instances of the same ground truth data can be created, such that $y_{k,1}$ and $y_{k,2}$ can have the same ground truth. The TMGAN generator can produce respective estimates, $\hat{x}_{k,1}$ and $\hat{x}_{k,2}$, based on $y_{k,1}$ and $y_{k,2}$. In various embodiments, $\hat{x}_{k,1}$ and $\hat{x}_{k,2}$ can be conditionally independent estimates, and noise separation component 112 can separate noisy texture from anatomy in $\hat{x}_{k,1}$ and $\hat{x}_{k,2}$. For example, a difference of $\hat{x}_{k,1}$ and $\hat{x}_{k,2}$ (e.g., $\hat{x}_{k,1}-\hat{x}_{k,2}$) can be generated to separate a bias and a texture (e.g., by noise separation component 112) from the estimates, $\hat{x}_{k,1}$ and $\hat{x}_{k,2}$. That is, by generating a difference of the two conditionally independent estimates, an anatomy portion of the outputs of the TMGAN generator can be subtracted, leaving only a texture portion associated with image 114, such that the TMGAN discriminator (e.g., discriminator 330) can consider a difference in noise of the texture, as opposed to considering both, the texture, and the anatomy. For example, the TMGAN discriminator can compare only a texture of fake images, fed to the TMGAN discriminator, against a texture of real images. As stated elsewhere herein, considering the anatomical portion of an image for making predictions can involve risks related to hallucinations. While the texture resulting from the subtraction of estimates, $\hat{x}_{k,1}$ and $\hat{x}_{k,2}$, can comprise some hallucinations, such hallucinations tend to concentrate less in the texture portion. Thus, a clinical impact of such hallucinations can be much less, for example, as compared to hallucinations associated with anatomical portions of an image (e.g., having a fake vessel). Further, while the texture of the fake images produced by the TMGAN generator can comprise some noise, any noise introduced by the TMGAN discriminator will not introduce fake anatomy in the images.

Network parameters $$\theta_g = \begin{bmatrix} \phi \\ \gamma \end{bmatrix}$$

can be provided to the TMGAN generator, and a parameter $\gamma$ can be introduced to compensate for potential amplitude differences between the texture resulting from the difference of the estimates and the texture of the real images (e.g., desired texture). The parameter $\gamma$ can be estimated during training of the TMGAN to adjust an amplitude of the fake texture, such that an amplitude of the fake texture can be the same as that of the real distribution. The fake texture samples and the real texture samples can be provided to the TMGAN discriminator at the same time, and the TMGAN discriminator can be trained (e.g., by training component 108) to identify a difference between the two, wherein the TMGAN discriminator can score the fake texture samples against the real texture samples.

In various aspects, training component 108 can train the generator to produce a denoised CT image or a sharpened CT image based on scoring of the texture of image 114 by the discriminator. For example, based on the scoring by the TMGAN discriminator, training component 108 can update a weight for the TMGAN discriminator during one iteration and update a weight for the TMGAN generator during another iteration. For example, at the beginning of the training, the TMGAN discriminator can be trained until a threshold. A stopping criteria for the training can comprise the TMGAN discriminator reaching a loss of 0.2 or a maximum number of updates being less than 10. In various embodiments, it can be desirable to limit a strength of the TMGAN discriminator. Thus, for each update of the TMGAN generator, the TMGAN discriminator can be trained until a loss of the TMGAN discriminator achieves a certain threshold or exceeds the maximum possible iterations. Upon training of the TMGAN discriminator, the entire TMGAN can be trained, during which time, parameters of the TMGAN discriminator can be frozen and parameters of the TMGAN generator can be updated based on the scoring by the TMGAN discriminator. In various aspects, training component 108 can use an algorithm for training the discriminator and the generator of the TMGAN for stable convergence.

In one or more embodiments, training component 108 can train the GAN for denoising noisy CT images. In one or more embodiments, training component 108 can train the GAN for deblurring blurred CT images. As such, enhanced CT images generated by the TMGAN generator can be denoised/deblurred CT images, but that can retain a texture of an original CT image (e.g., a noisy/blurred CT image). It is to be appreciated that the TMGAN can be applicable to other types of images, including, MRIs, PETs, or another type of medical image.

Figure 2:
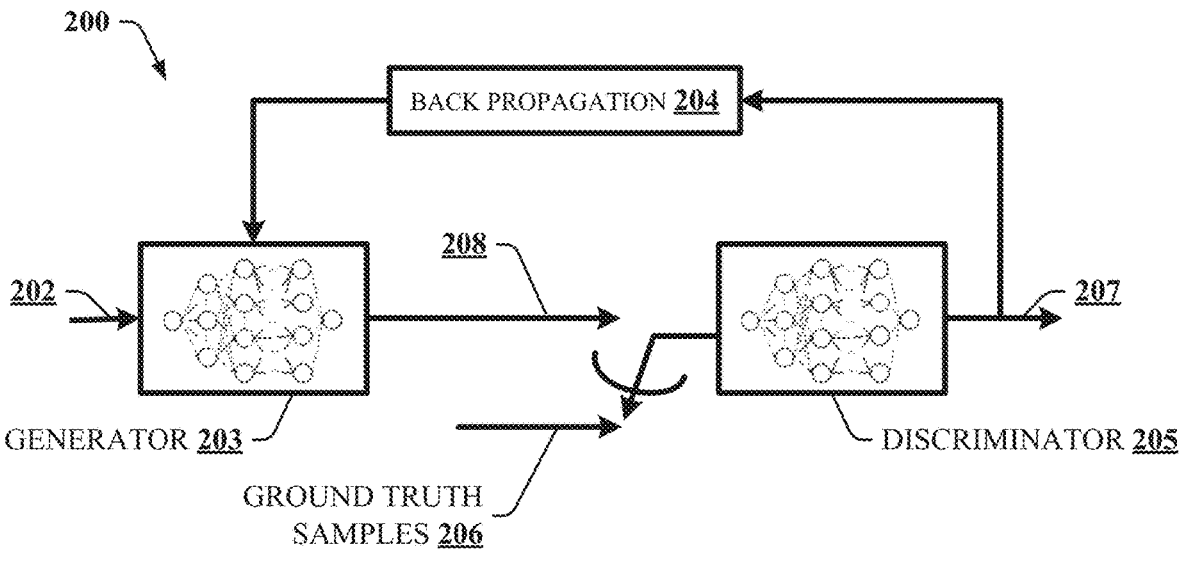
FIG. 2 illustrates flow diagrams of example, non-limiting training and inference phases of a GAN in accordance with one or more embodiments described herein.
Figure 2:
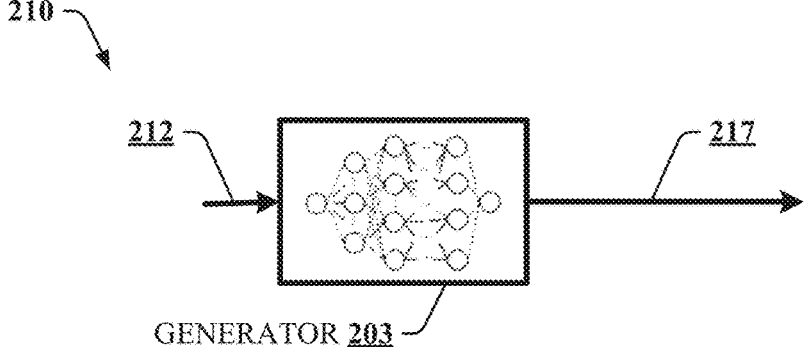

FIG. 2 illustrates flow diagrams of example, non-limiting training phase 200 and inference phase 210 of a GAN in accordance with one or more embodiments described herein. One or more embodiments discussed with reference to FIG. 2 can be performed by one or more components of system 100 of FIG. 1. Repetitive description of like elements and/or processes employed in respective embodiments is omitted for sake of brevity.

Generally, a GAN can comprise two networks wherein a first network can be a generator expected to generate samples from a ground truth distribution, and a second network can be a discriminator that can score a performance of the generator during training to cause the generator to produce more realistic samples. Upon training, the generator can be used to produce samples from a desired distribution. For example, during training phase 200, of the GAN, generator 203 can ingest random vector 202 from a ground truth distribution and generate samples 208. During training phase 200, samples 208 generated by generator 203 can be scored by discriminator 205 against ground truth samples 206 to produce score 207 for a performance of generator 203. Based on score 207, generator 203 can be trained via back-propagation 204. Upon training of generator 203, generator 203 can be employed during inference phase 210 to ingest random vector 212 from a ground truth distribution (e.g., a desired distribution) and generate samples 217 from the ground truth distribution. For example, during training phase 2000, generator 203 can ingest a noisy/blurred CT image from a ground truth distribution and generate enhanced CT images 208.

In a basic GAN, all denoised CT images generated by a generator of the GAN can be fed to a discriminator of the GAN, and the discriminator can check if an output of the generator looks like a real image without checking for correct content. However, the output of the generator can comprise unreal features known as hallucinations that can have fake features in results and images. Hallucinations can be described as features that can look realistic but not be present in a clean ground truth image. That is, a basic GAN can introduce artifacts into images. The reason that the discriminator can only check if the output of the generator looks like a real image is because the discriminator does not compare the content of a fake image included in the output of the generator to the real image. Thus, the discriminator can only determine whether the fake image appears to be originating from a real distribution. Hallucinations can be present in the texture or in the anatomy of an image, but hallucinations can be problematic if they appear in the anatomy because they can appear as real features to clinicians.

In various embodiments of the present disclosure, a TMGAN can be employed towards achieving texture-rich enhanced CT images by matching a texture in an enhanced CT image to a desired texture. Stated differently, in various embodiments, texture-rich enhanced CT images can be generated by matching a distribution of texture in results generated by the TMGAN to the desired texture. In various embodiments, denoised CT images or deblurred CT images can be produced while ensuring that hallucinations are absent from the denoised CT images or deblurred CT images. To alleviate the risk of hallucinations in GANs for clinical applications, the TMGAN architecture discussed in the present disclosure can separate anatomical features contained in a clean CT image from texture during training and match the texture to a desired example texture that can be taken from a small number of water phantom reconstructions. This can be achieved by adding two independent noise samples to the same ground truth images and processing them with a Siamese network (e.g., the TMGAN generator) to produce two conditionally independent estimates. The difference of the two conditionally independent estimates can be considered to acquire the texture of an image and the texture can be fed to the discriminator to compare against the desired texture. Consequently, the TMGAN generator can be trained to produce denoised or sharpened CT images with a desired texture. Additional aspects of the TMGAN referenced in various embodiments have been described in greater detail with reference to the subsequent figures.

Figure 3:
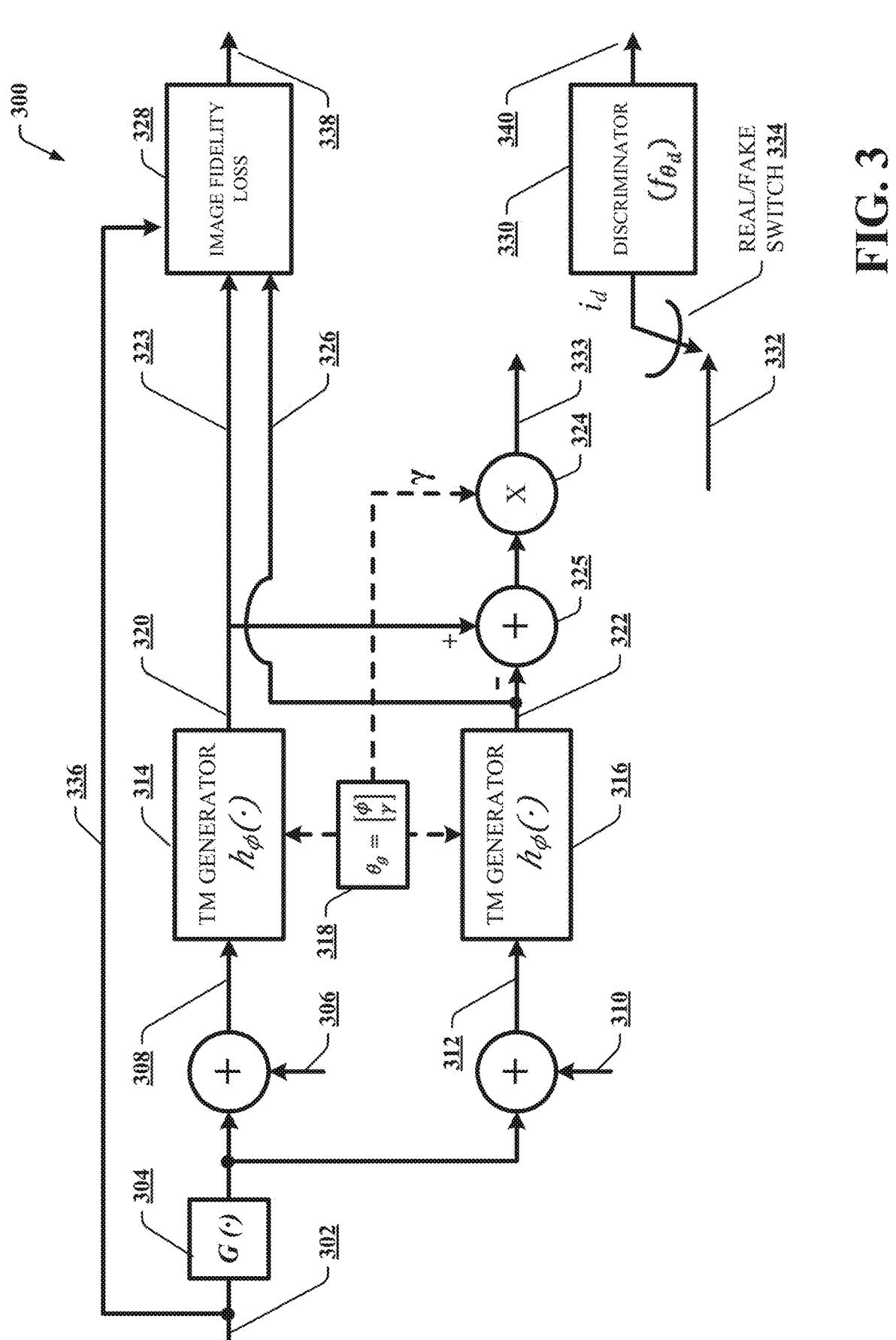
FIG. 3 illustrates a flow diagram of an example, non-limiting network architecture of a TMGAN that can be employed for CT image enhancement in accordance with one or more embodiments described herein.

FIG. 3 illustrates a flow diagram of an example, non-limiting network architecture 300 of a TMGAN that can be employed for CT image enhancement in accordance with one or more embodiments described herein. One or more embodiments discussed with reference to FIG. 3 can be performed by one or more components of system 100 of FIG. 1. Repetitive description of like elements and/or processes employed in respective embodiments is omitted for sake of brevity.

In various embodiments, a TMGAN can be employed towards achieving texture-rich enhanced CT images by matching a texture in the enhanced CT images to a desired/target texture. The TMGAN can comprise network architecture 300. Network architecture 300 of the TMGAN can enable separating (e.g., by noise separation component 112) anatomy from texture in the enhanced CT images during training (e.g., by training component 108) of the TMGAN, followed by matching the texture to desired example textures. For example, two independent noise samples can be added (e.g., by input component 110) to a ground truth image to generate two independent noisy samples of images that can be conditionally independent. Stated differently, the two independent noise samples can be added to the same ground truth image to generate two independent noisy samples of images that can be conditionally independent. The two independent noisy samples of images can be processed with a Siamese network (the generator of the TMGAN) to produce two conditionally independent estimates. A difference of the two conditionally independent estimates can be considered for acquiring the texture part of the ground truth image and feed it to a discriminator of the TMGAN. The discriminator can score the texture produced by the generator against samples of a desired texture while training. Consequently, the generator can be trained to produce denoised or sharpened images with the desired texture.

More specifically, Y being an observed image (e.g., a CT image) from which an entity (e.g., a hardware, a software, machine, artificial intelligence (AI) or a human entity) can aim to recover a true image X, and the forward model of equation 1 can be assumed towards formulation of a problem that can be addressed by various embodiments herein.

Equation 1: $Y=G(X)+W$, wherein W can represent noise and $G(\cdot)$ can model other deformations in Y. For example, in deblurring applications, $G(\cdot)$ can be a blurring function. The noise W can be assumed to be zero mean and independent of X such that $\mathbb{E}[W|X]=0$.

Then, an estimator $h(\cdot)$ can be formed to get an estimate $\hat{X}=h(Y)$ of X. The estimate $\hat{X}$ can be defined as a sum of three components, as described by equation 2.

Equation 2: $\hat{X}=X+B_X+\delta_X$, wherein $B_X=\mathbb{E}\,[\hat{X}\,|X]-X$ can be the bias in the estimate, and $\delta_X=\hat{X}-\mathbb{E}\,[\hat{X}|X]$ can be the noise in the estimate. If is to be noted that $B_X$ can be deterministic for known X, whereas $\delta_X$ can be a random variable and a function of X.

While some techniques for estimation approaches known in the art, such as minimum mean square error (MMSE), tend to remove the noise $\delta_X$, producing overly-smooth results, in various embodiments of the present disclosure, a certain amount of noise with the target texture can be retained. For example, since only the ground truth, X, and the estimate, $\hat{X}$, can be observed, the noise, $\delta_X$, cannot be observed. Thus, it can be challenging to train an algorithm to generate the noise, $\delta_X$, with the target texture distribution/to produce the target noise distribution. Thus, to address the challenge, two independent noise instances, $W_1$ and $W_2$, can be added to G(X) to obtain two instances of estimates $\hat{X}_1=h(Y_1)$ and $\hat{X}_2=h(Y_2)$. Then, based on equation 3, a difference of the estimates can be generated to acquire a distribution of texture of the ground truth image.

Equation 3: $\hat{X}_1-\hat{X}_2=(X+B_X+\theta_{X1})-(X+B_X+\delta_{X2})=\delta_{X1}-\theta_{X2}$, wherein $\delta_{X1}$ and $\delta_{X2}$ can be conditionally independent and identically distributed given X.

If $T_1$ and $T_2$ can be two independent and identically distributed (i.i.d.) samples of the target texture, then the distribution (e.g., texture) of $\delta_{X1}-\delta_{X2}$ can be matched to the distribution (e.g., texture) of $T_1-T_2$ to generate enhanced images with the target texture. Further, the following theorem 1 can be considered.

Theorem 1: Let $\delta_1-\delta_2\sim\mathcal{N}\,(0,2\sigma^2)$ and $\delta_1$, $\delta_2$ be real valued i.i.d. random variables with a distribution that is symmetric about 0. Then $\delta_1\sim\mathcal{N}\,(0,\,\sigma^2)$.

Proof: Let $Z=\delta_1-\delta_2$. Since Z, $\delta_1$, and $\delta_2$ are real valued, all of their characteristic functions exist. Since $Z\sim\mathcal{N}\,(\mu,\,2\sigma^2)$, its characteristic function is given by $\phi_Z(t)=\mathbb{E}\,[e^{jtZ}]=e^{-\sigma^2 t^2}$.

Since $\delta_1$ and $\delta_2$ are independent, then $$\phi_Z(t) = \mathbb{E}\left[e^{jt(\delta_1-\delta_2)}\right]$$
$$= \mathbb{E}\left[e^{jt\delta_1}e^{-jt\delta_2}\right]$$
$$= \mathbb{E}\left[e^{jt\delta_1}\right]\mathbb{E}\left[e^{-jt\delta_2}\right]$$

Since $\delta_1$ and $\delta_2$ are symmetric about 0, we can remove the negative sign in the final expected value. Since $\delta_1$ and $\delta_2$ are i.i.d., the two expected values are the same, hence $\phi_Z(t)=\mathbb{E}\,[e^{jt\delta_1}]^2$. Taking a square root yields $$\mathbb{E}\left[e^{jt\delta_1}\right] = \pm e^{-\frac{1}{2}\sigma^2 t^2}.$$

Since the characteristic function is continuous, the choice of $\pm$ is independent of t. Since the left hand side is 1 when t=0, it can be observed that the characteristic function of $\delta_1$ is $$e^{-\frac{1}{2}\sigma^2 t^2}.$$

By uniqueness of the characteristic function, this can imply that $\delta_1\sim\mathcal{N}\,(\mu,\,\sigma^2)$, and a similar inference can be made for $\delta_2$.

TMGAN:

In various embodiments, a TMGAN can be employed for matching the texture, $\delta_{X1}-\delta_{X2}$, to the example texture, $T_1-T_2$. The TMGAN can obtain the target texture while recovering X from the observed image Y. As stated above, the TMGAN can comprise network architecture 300. It is to be appreciated that in FIG. 3, lower-case letters denote realizations of the aforementioned random variables.

In various embodiments, a ground truth image, $x_k$, can be input to network architecture 300 at 302, wherein for each ground truth image, $x_k$, the deformation expected in the application of the TMGAN (e.g., G ($\cdot$)) can first be applied at 304. Specifically, in deblurring applications, G($\cdot$) can be a Gaussian blurring operator, but for pure denoising applications, G($\cdot$) can be the identity. Stated differently, G($\cdot$) can be the deformity in the application, wherein for deblurring applications, G($\cdot$) can be a blurring function and for denoising applications, G($\cdot$) can be an identity. Then with the $k^{th}$ ground truth image, two conditionally independent inputs, $y_{k,1}$ and $y_{k,2}$, can be respectively generated at 308 and 312 by respectively adding independent noise samples, $w_{k,1}$ and $w_{k,2}$, at 306 and 310 to $x_k$. That is, $x_k=k^{th}$ ground truth high resolution sample and $w_{k,m}=m^{th}$ noise sample for $x_k$. Further, $t_{k,i}=i^{th}$ sample of target noise texture (for $x_k$). For the two inputs, the TM generator $h_\phi(\cdot)$ of the TMGAN can produce two estimates, $\hat{x}_{k,1}=h_\phi(y_{k,1})$ and $\hat{x}_{k,2}=h_\phi(y_{k,2})$. For example, TM generator 314 can produce estimate $\hat{x}_{k,1}=h_\phi(y_{k,1})$ at 320 and TM generator 316 can produce estimate $\hat{x}_{k,1}=h_\phi(y_{k,2})$ at 322. Then according to equation 3, a difference between the two estimates can be generated at 325 to generate samples of a fake texture difference, $\delta_{X1}-\delta_{X2}$. Corresponding samples of the real texture difference, $t_{k,1}-t_{k,2}$, can be generated by taking a difference of sample images of target texture.

To match the distribution of $\delta_{X1}-\delta_{X2}$ with $T_1-T_2$, a generator-discriminator architecture (e.g., network architecture 300) can be employed, wherein the discriminator network (e.g., discriminator 330) can be trained to differentiate the scaled fake texture difference $\gamma(\delta_{X1}-\delta_{X2})=\gamma(\hat{x}_{k,1}-\hat{x}_{k,2})$, generated at 324, from the real texture difference $t_{k,1}-t_{k,2}$. Consequently, the generator network (e.g., TM generator 314 and TM generator 316) can be trained to produce more realistic texture differences, $\delta_{X1}-\delta_{X2}$, and more accurate estimates, $\hat{x}_{k,1}$, $\hat{x}_{k,2}$. Since the fake texture differences and training texture differences can vary in amplitude, the parameter $\gamma$ can be introduced to compensate for a potential amplitude difference between the fake texture difference and the real texture difference. The $\gamma$ parameter can be estimated as part of the training process or set manually.

TMGAN Discriminator:

Discriminator 330 can be trained to differentiate between the fake input $\gamma(\delta_{X1}-\delta_{X2})=\gamma(\hat{x}_{k,1}-\hat{x}_{k,2})$, received by discriminator 330 at 333, and the real target texture input $t_{k,1}-t_{k,2}$, received by discriminator 330 at 332, by minimizing the Binary Cross-Entropy loss (BiCE). The trainable generator parameter vector can be denoted as, $$\theta_g = \begin{bmatrix}\phi\\\gamma\end{bmatrix},$$

as illustrated at 318 in FIG. 3. Furthermore, the discriminator output at 340 can be denoted as $f_{\theta_d}(\cdot)$, wherein $\theta_d$ can be a discriminator parameter vector. Then, using the notations, discriminator 330 can minimize the loss function presented in equation 4 with respect to $\theta_d$.

$$d(\theta_g, \theta_d) =$$

Equation 4

$$-\frac{1}{K}\sum\nolimits_{k=1}^{K}\left[\log\left(f_{\theta_d}(t_{k,1} - t_{k,2})\right) + \log\left(1 - f_{\theta_d}\left(\gamma(\hat{x}_{k,1} - \hat{x}_{k,2})\right)\right)\right],$$

wherein K can be a total number of training samples.

Discriminator 330 can be trained to generate a score of 1 to the real inputs and a score of 0 to the fake inputs, as illustrated by real/fake switch 334. Discriminator 330 can perform operations only on the texture part of an image (e.g., a CT image), which can avoid a risk of possible addition of fake details in enhanced images.

TMGAN Generator:

As discussed above, the TMGAN Generator (e.g., TM generator 314 and TM generator 316) can accept two conditionally independent and identically distributed noisy images, $y_{k,1}$ and $y_{k,2}$, to generate estimates, $\hat{x}_{k,1}$ and $\hat{x}_{k,2}$, respectively. For example, TM generator 314 can accept the noisy image, $y_{k,1}$, at 308, to generate estimate, $\hat{x}_{k,1}$, at 320, and TM generator 316 can accept the noisy image, $y_{k,2}$, at 312, to generate estimate, $\hat{x}_{k,2}$, at 322. It is to be appreciated that, each of the two branches of the TM generator network illustrated in FIG. 3 (e.g., TM generator 314 and TM generator 316) can share the same parameters, so that the combined TMGAN generator consisting of TM generator 314 and TM generator 316 can be treated as a Siamese network for training. The TMGAN generator can be trained to produce more realistic texture differences by minimizing the BiCE loss, referred to as texture loss. For the TMGAN generator to produce estimates with structure in accordance with $x_k$, an image fidelity loss can be added, at 328, between the estimates and ground truth image, $x_k$, to a generator loss function, and a bias-reducing loss function can be employed for adding the image fidelity loss. It can be demonstrated by techniques known in the art that the bias-reducing loss function can recover more structure in the denoised images as compared to an MSE loss function. Image fidelity loss can compare $\hat{x}_{k,1}$ and $\hat{x}_{k,2}$ with $x_k$, as illustrated by arrows 323, 326 and 336, and output 338 of the bias-reducing loss function can be used to retrain the TMGAN generator.

Thus, the TMGAN generator loss function can be as presented in equation 5:

$$g(\theta_g, \theta_d) = \frac{1}{K}\sum\nolimits_{k=1}^{K}\left\{-\lambda\log\left(f_{\theta_d}\left(\gamma(\hat{x}_{k,1} - \hat{x}_{k,2})\right)\right) + \right.$$

Equation 5

$$\left. \frac{1}{2\sigma^2}\left(\|\hat{z}_{k,1} - x_k\|^2 + \|\hat{z}_{k,2} - x_k\|^2\right)\right\},$$

wherein, $\hat{z}_{k,1} = \alpha\hat{x}_{k,1} + (1 - \alpha)\hat{x}_{k,2}$, $\hat{z}_{k,2} = (1 - \alpha)\hat{x}_{k,1} + \alpha\hat{x}_{k,2}$, $\lambda$ can represent a parameter that can control a relative importance of texture and image fidelity loss, $\sigma$ can denote a permissible deviation of estimates from $x_k$ in Houndsfield Unit (HU), and $\alpha$ can be set to 0.5 (i.e., $\alpha=0.5$) in order to achieve a maximum bias reduction setting.

Training and Inference:

Existing research can indicate that adversarial training of generator and discriminator networks can often be unstable without a guarantee of convergence. Therefore, in various embodiments, a training procedure was developed for the TMGAN that can promote a stable convergence. Having an optimal discriminator can be ideal, therefore, multiple updates were performed for the discriminator. However, to avoid a situation where the discriminator can be too strong to provide the generator with any valuable information to learn, discriminator weights were updated only when its cost was greater than a threshold $T_d$. Algorithm 1 can show a pseudocode that can be implemented to train the TMGAN generator. In experiments that were conducted for the TMGAN, $T_d$ was set to 0.2. $N_d$ was set to 5 for deblurring experiments and 1 for denoising experiments. The number of epochs were varied for each experiment. However, it was discovered that about 15 (~15) epochs can be sufficient. For inference, only the trained $h_\phi(\cdot)$ was employed.

```
Algorithm 1: Training Pseudocode for TMGAN
Input: N: total number of generator updates,
         T_d: threshold for the discriminator loss,
         N_d: maximum discriminator updates per generator update
      θ_g, θ_d ← Initialize network parameters.
      for n ← 0 to N do
          n_d ← 0
          while d(θ_g, θ_d) > T_d AND n_d < N_d do
              θ_d ← Update θ_d with one iteration of Adam
                  optimizer to minimize d(θ_g, θ_d)
              n_d ← n_d + 1
          end
          θ_g ← Update θ_g with one iteration of Adam
              optimizer to minimize g(θ_g, θ_d)
      end
```

Algorithm 1 can be presented as:

```
Initialize network parameters θ_g and θ_d randomly.
N_d ← Maximum updates allowed for discriminator
    per generator update
T_d ← Threshold for discriminator loss
N_g ← Total generator updates
For n = 0 : N_g{
    n_d = 0
    while (d(θ_g, θ_d) > T_d &&n_d < N_d) {
        θ_d ← Update θ_d with one iteration of Adam
            optimizer to minimize d(θ_g, θ_d)
        n_d ← n_d + 1 }
    θ_g ← Update θ_g with one iteration of Adam
        optimizer to minimize g(θ_g, θ_d)
```

Blending:

It can be desirable that $\lambda$ and $\sigma$ in equation 5 be tuned to get the desired balance of texture and image detail. However, fine tuning of $\lambda$ and $\sigma$ can be time consuming. Therefore, a blending scheme can be adopted in the inference phase to achieve the desired balance of texture and image detail while keeping the advantages of texture produced by TMGAN. Since blending can be done in the inference phase, it can alleviate the need of re-training to change the balance.

Results of TMGAN were blended with $\lambda>0$ with TMGAN with $\lambda=0$ according to a suitable blending ratio. It is to be appreciated that a TMGAN with $\lambda=0$ can be a bias reducing network, referred to as BR-a herein. If $h_{BR-\alpha}(\cdot)$ represents a trained bias reducing network with a hyperparameter set to $\alpha$, then the blended result can be obtained as described by equation 6, wherein where y can represent the noisy input, $\hat{x}^{(TMGAN-blended)}$ can represent the estimated result and $\eta$ can represent the blending ratio. It is to be noted that the above blending scheme can be applied only if needed, and as shown elsewhere herein, $\hat{x}^{(TMGAN-blended)}$ can preserve desirable texture properties of the TMGAN and good image detail characteristic of the BR-a network.

In summary, the TMGAN discussed in various embodiments can comprise a generator network comprising a Siamese network and a discriminator network. The TMGAN generator (e.g., consisting of TM generator 314 and TM generator 316) can produce CT images from a clean image, $x_k$, that can be an original CT image. $G(\cdot)$ can be a deformity developed for denoising and/or sharpening a CT image. For denoising applications, $G(\cdot)$ can be an identity operator, and for sharpening applications, $G(\cdot)$ can be a blurring operation. Noise, $w_{k,1}$ and $w_{k,2}$, can be added (e.g., by input component 110) to the clean image, $x_k$, to respectively generate conditionally independent and identically distributed noisy images, $y_{k,1}$ and $y_{k,2}$, and the deformity $G(\cdot)$ can be blurred in addition to the noise. In various embodiments, $w_{k,1}$ and $w_{k,2}$, can be different samples of noisy images taken from the same distribution, and $w_{k,1}$ and $w_{k,2}$ can be added to the original CT image pixel-by pixel and be superimposed on the CT image. In various embodiments, $w_{k,1}$ and $w_{k,2}$, can be taken from different parts of a water phantom scan.

Multiple images of noisy instances of the same ground truth data can be created, such that $y_{k,1}$ and $y_{k,2}$ can have the same ground truth. The TMGAN generator can produce respective estimates, $\hat{x}_{k,1}$ and $\hat{x}_{k,2}$, based on $y_{k,1}$ and $y_{k,2}$. A difference of $\hat{x}_{k,1}$ and $\hat{x}_{k,2}$ (e.g., $\hat{x}_{k,1}-\hat{x}_{k,2}$) can be generated to separate a bias and a texture (e.g., by noise separation component 112) from the estimates, $\hat{x}_{k,1}$ and $\hat{x}_{k,2}$. That is, an anatomy portion of an output of the TMGAN generator can be subtracted, such that the TMGAN discriminator (e.g., discriminator 330) can consider a difference in noise of the texture, as opposed to considering both, the texture, and the anatomy. For example, the TMGAN discriminator can compare only a texture of fake images, fed to the TMGAN discriminator, against a texture of real images. As stated elsewhere herein, considering the anatomical portion of an image for making predictions can involve risks related to hallucinations. While the texture resulting from the subtraction of estimates, $\hat{x}_{k,1}$ and $\hat{x}_{k,2}$, can comprise some hallucinations, the hallucinations tend to concentrate less on the texture portion. Thus, a clinical impact of such hallucinations can be much less, as compared to hallucinations associated with anatomical portions of an image (e.g., having a fake vessel). As such, the TMGAN discriminator can compare only a texture of fake images fed to the TMGAN discriminator against a texture of real images. The texture of the fake images can comprise some noise, and any noise introduced by the TMGAN discriminator does not introduce fake anatomy in the images.

Network parameters $$\theta_g = \begin{bmatrix} \phi \\ \gamma \end{bmatrix}$$

can be provided to the TMGAN generator, and the parameter $\gamma$ can be introduced to compensate for potential amplitude differences between the texture resulting from the difference of the estimates and the texture of the real images (e.g., desired texture). As noted earlier, $\gamma$ can be estimated during training of the TMGAN to adjust an amplitude of the fake texture, such that an amplitude of the fake texture can be the same as that of the real distribution. The fake texture samples and the real texture samples can be provided to the TMGAN discriminator at the same time, and the TMGAN discriminator can be trained (e.g., by training component 108) to identify a difference between the two, wherein the TMGAN discriminator can score the fake texture samples against the real texture samples.

Based on the scoring by the TMGAN discriminator, the system (e.g., system 100) can update a weight for the TMGAN discriminator during one iteration and update a weight for the TMGAN generator during another iteration. For example, at the beginning of the training, the TMGAN discriminator can be trained until a threshold. As discussed above, stopping criteria for the training can comprise the TMGAN discriminator reaching a loss of 0.2 or a maximum number of updates being less than 10. In various embodiments, it can be desirable to limit a strength of the TMGAN discriminator. Thus, for each update of the TMGAN generator, the TMGAN discriminator can be trained until its loss achieves a certain threshold or exceeds the maximum possible iterations. Upon training of the TMGAN discriminator, the entire TMGAN can be trained, during which time, parameters of the TMGAN discriminator can be frozen and parameters of the TMGAN generator can be updated based on the scoring by the TMGAN discriminator. It is to be appreciated that the TMGAN can be applicable to other types of images, including MRIs, PETs, or another type of medical image.

Figure 4:
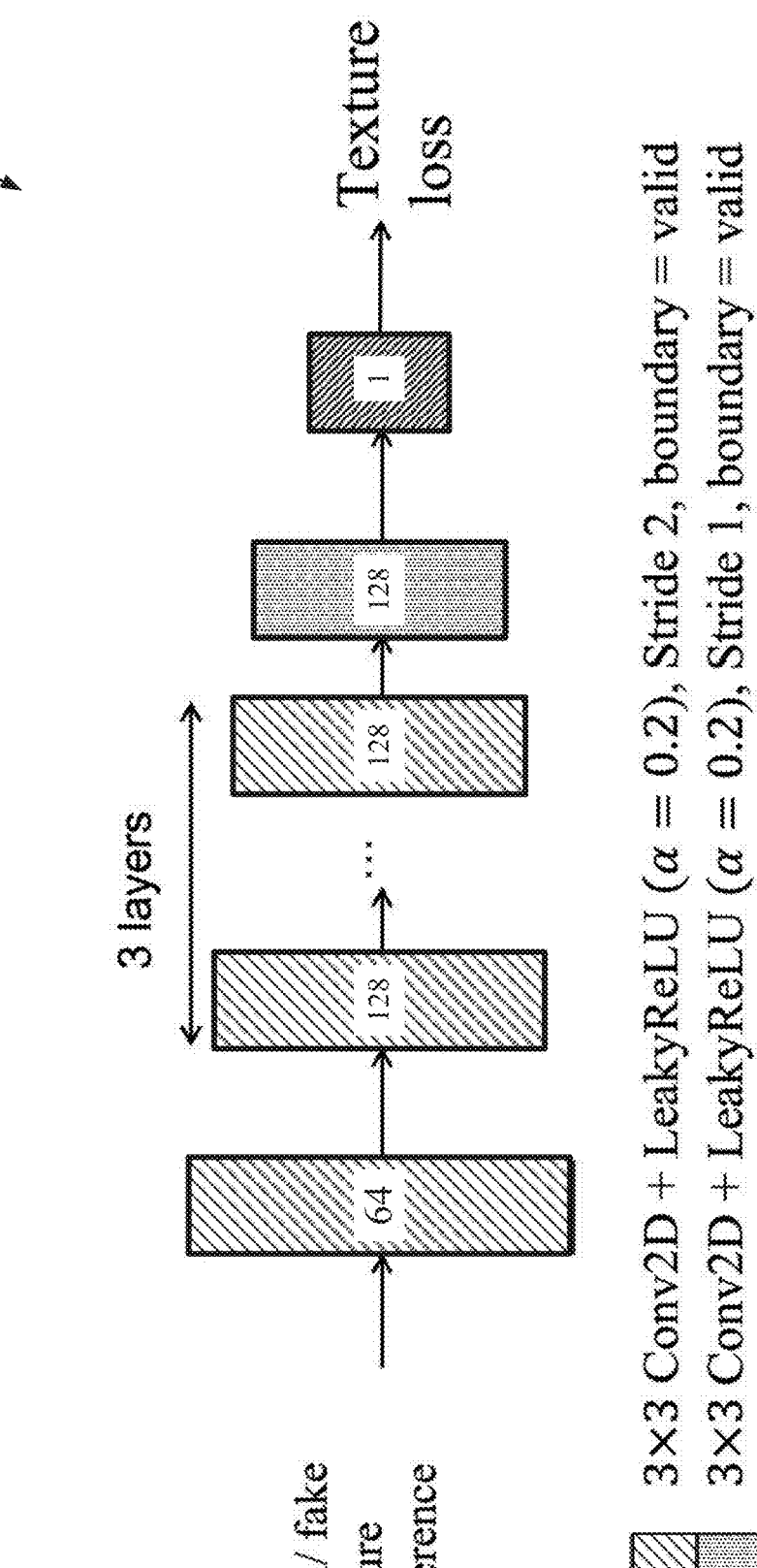
FIG. 4 illustrates a flow diagram of an example, non-limiting architecture of a TMGAN discriminator that can be employed for CT image enhancement in accordance with one or more embodiments described herein.

FIG. 4 illustrates a flow diagram of an example, non-limiting architecture 400 of a TMGAN discriminator that can be employed for CT image enhancement in accordance with one or more embodiments described as follows. One or more embodiments discussed with reference to FIG. 4 can be performed by one or more components of system 100 of FIG. 1. Repetitive description of like elements and/or processes employed in respective embodiments is omitted for sake of brevity.

With continued reference to FIG. 3, an experimental setup for training and testing the TMGAN has been described as follows. In various embodiments, the TMGAN can be trained for denoising and deblurring noisy CT images, separately. The network architecture of the TMGAN (e.g., network architecture 300) can remain the same for both applications, however, training data and test data can be different for either application. For example, for the architecture of the TMGAN generator (e.g., TM generator 314 and TM generator 316), a CNN can be adopted with a single input channel and 17 convolution layers. The architecture of the TMGAN discriminator (e.g., architecture 400) can be modified to approximately match a strength of the TMGAN discriminator (e.g., a number of trainable parameters) to that of the TMGAN generator.

A first step for training the TMGAN can comprise generating clean ground truth images for denoising and high-resolution clean images for deblurring. For both tasks, independent noise samples and sample images for a target/desired texture can be utilized. The images utilized in experiments that were conducted in connection with the various embodiments were acquired using a GE Revolution CT scanner (General Electric (GE) HealthCare, WI, USA). In various experiments, three water phantoms were scanned with a tube voltage of 120 kilovoltage peak (kVp) and a current of 350 milliampere (mA), and the scans were reconstructed with filtered backprojection (FBP) to a slice thickness of 0.625 millimeters (mm) and used for generating noise realizations. For generating the sample images for the target/desired texture (i.e., texture samples), water phantom scans were used, and a choice of the texture samples was inspired based on clinical evaluations. Three water phantoms were scanned with a tube voltage of 120 kVp and a current of 380 mA. The scans were reconstructed with a standard (stnd) recon kernel on the GE Healthcare scanner. The recon DFOV (Display-Field-of-View) can depend on the experiments, as specified in the following description section. It is to be appreciated that a texture in FBP reconstructions can be visualized in FIG. 6, at 602, which is a water phantom scan reconstructed using the standard recon kernel on a GE Revolution CT scanner (GE HealthCare, WI, USA).

Further, ten raw clinical scans were acquired with an X-ray tube voltage and current varying from scan to scan in the range of 80-140 kVp and 40-1080 mA, respectively. The scans were reconstructed using GE's TrueFidelity DLIR technology to a slice thickness of 0.625 mm and dimension of 512×512. The reconstructed volumes were used as clean ground truth for denoising. For denoising, each ground truth patch was added to two randomly selected noise patches to form two conditionally independent noisy realizations for the same ground truth patch.

To create training pairs for deblurring experiments, that is, to generate high-resolution clean ground truth images, blur the input and scale noise samples before adding to the blurred images, $\beta$ was set to zero (i.e., $\beta=0$) since a non-zero $\beta$ can be used to retain texture in the sharpened images. $\beta$ is a parameter that can allow one the standard deviation of the noise in the ground truth to be controlled.

In various experiments, the TMGAN can be expected to retain texture. For the blurring model, $\rho=[0.244, 0.244, 0.344]$ mm was used, the network was trained for $\sigma_{input}=74.63$ HU, which can be the noise level expected in the test image, and a was set to 1. In both tasks, the axial slices in the training and validation volumes were broken into 128×128 patches, with the patches randomly partitioned as 97% for training and 3% for validation. To train the network, the Adam optimizer was used with a learning rate of $3\times10^{-5}$ for the TMGAN generator and $3\times10^{-6}$ for the TMGAN discriminator and a mini-batch size of 32. Table 1 and Table 2 describe test exams for the TMGAN.

TABLE 1

Test exams for the TMGAN. In Table 1, "Stnd." stands for "standard."

| Exam name | Scanned object | Focal spot | Settings (kVp/ mA) | DFOV (cm) | Recon kernel | Appli- cation | Result |
|---|---|---|---|---|---|---|---|
| Exam 1 | Clinical body | extra large | 80/375 | 31.1 | Stnd. | Denoising | Image |
| Exam 2 | Clinical body | small | 100/220 | 49.2 | Stnd. | Denoising | Image |
| Exam 3 | Clinical body | small | 120/110 | 35.0 | Stnd. | Denoising | Image |
| Exam 4 | Clinical body | small | 120/350 | 39.4 | Stnd. | Denoising | Image |
| Exam 5i-5x | Clinical body | small/ large/ extra large | 80-140/ 40-1080 | 31.1- 49.2 | DLIR | Denoising | PSNR, SSIM |
| Exam 6 | Clinical body | extra large | 120/530 | 15 | Bone+ | Deblurring | Image |
| Noise 1 | Water phantom | small | 120/350 | 40 | Stnd. | Denoising | NPS, PSNR |
| Noise 2 | Water phantom | small | 120/350 | 15 | Bone+ | Deblurring | NPS |

Figure 5:
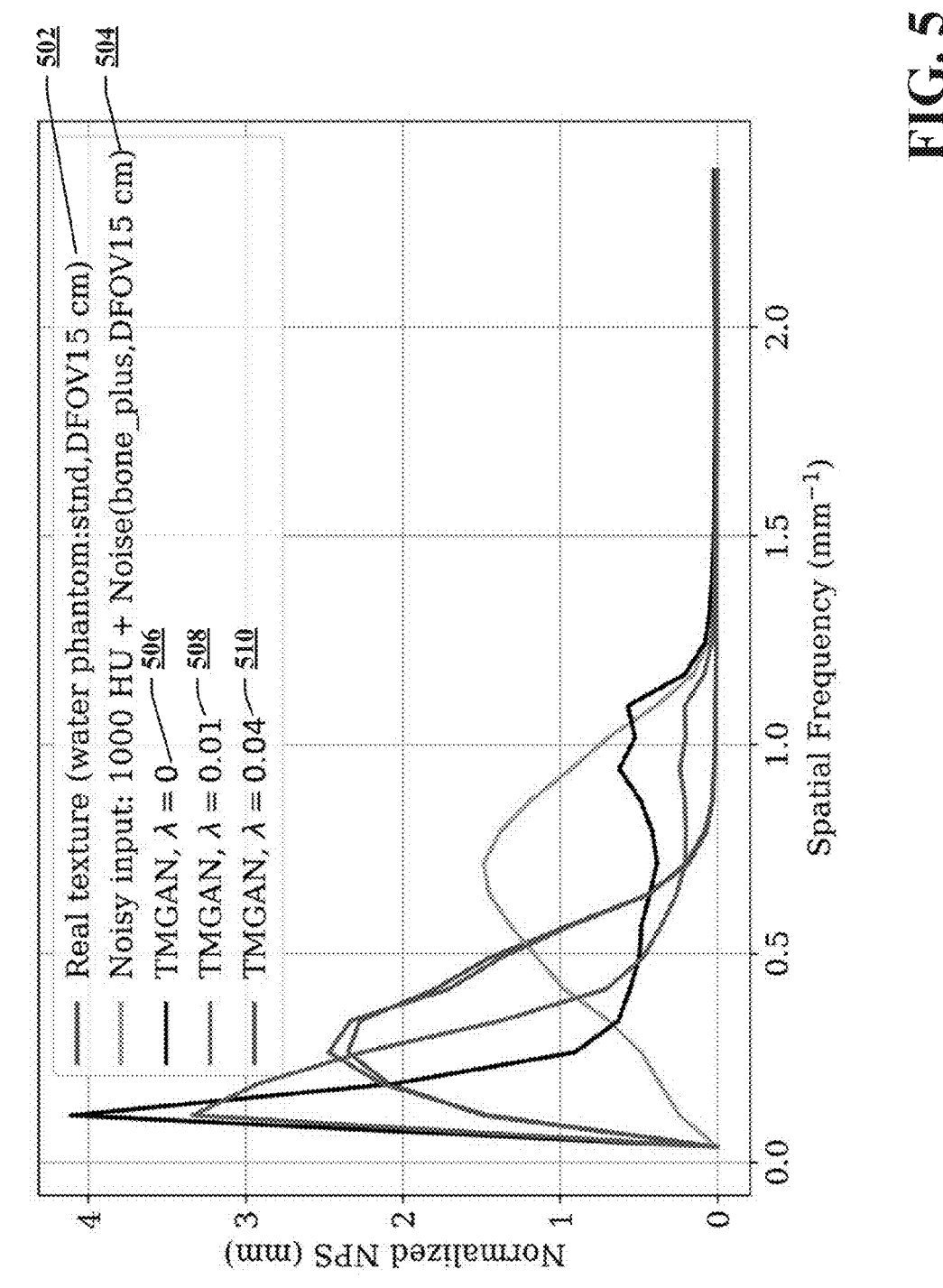
FIG. 5 illustrates an example, non-limiting graph of a noise power spectrum (NPS) based on results of a TMGAN in accordance with one or more embodiments described herein.

FIG. 5 illustrates an example, non-limiting graph 500 of an NPS based on results of a TMGAN in accordance with one or more embodiments described herein. Repetitive description of like elements and/or processes employed in respective embodiments is omitted for sake of brevity.

A performance of the TMGAN described in various embodiments was evaluated by comparing an NPS of results generated by the TMGAN with an NPS of a desired texture.

In various embodiments, to generate the NPS, multiple uniform regions of interest (ROIs) were selected during a clinical exam (exam 2), followed by computing the NPS, averaging the NPS and normalizing the NPS. Table 2 illustrates the main experimental set-up for training and testing the TMGAN. The TMGAN was tested for two applications, namely, denoising and deblurring. Thus, two sets of training and test data were generated. The texture samples for the desired texture were acquired from a standard recon of a water phantom. A pre-defined generator architecture and a pre-defined discriminator architecture were adopted. A strength of the discriminator architecture was matched with that of the generator. A patch size for training was 128×128, a learning rate for the generator was $3\times10^{-5}$, and a learning rate for the discriminator was $3\times10^{-6}$. For the deblurring application, training pairs were created using a noise preserving sharpening filter (NPSF) with $\beta=0$, $\alpha=1.0$, and $\rho=[0.244, 0.244, 0.344]$ mm.

Table 2 further details the test exams used in experiments. Quantitative and qualitative evaluations were performed using volumes reserved for testing. To emphasize, none of the test exams were used in training. Texture in the input and results with NPS were compared. To get a smooth NPS, an image containing only soft tissues (0 HU) was assumed and a suitable test water phantom noise (noise 1 or noise 2 in Table 1) was added to the image to create a uniform noisy input and produce results. Then, multiple patches of uniform areas in the volume were selected to compute NPS and report the averaged normalized 1D NPS based on a pre-defined procedure. Five low-dose clinical exams, exams 1-4 and exam 6, were scanned for denoising and deblurring, respectively. The clinical exam for deblurring results, exam 6, has been captured with extra larger focal spot size, which produced blurred features in the captured image. Due to the exams being clinical exams, ground truth for them was not available. To generate the ground truth, exams 5i-5x were reconstructed with GE's TrueFidelity DLIR technology, and the images generated were treated as clean images. Noise was added to the clean images, followed by denoising the images with various algorithms and reporting quantitative results for the denoised results using the PSNR and structural similarity (SSIM).

For denoising, results of the TMGAN exams were compared with MSE, BR-$\alpha$ with $\alpha=0.5$, traditional GAN referred to as trad-GAN, wherein image denoised by the generator can be directly fed to the discriminator, and WGAN-VGG. For fair comparisons, the generator and discriminator architectures were kept the same (where applicable) along with hyperparameters for training for MSE, BR-a, trad-GAN. For WGAN-VGG, a publicly available implementation was used. The networks were tuned to get the best possible results with the data. For deblurring, the TMGAN results were compared with a denoising sharpener and NPSF results. The denoising sharpener can remove noise from input images fully while sharpening. The NPSF method with $\beta$ set as $\beta_{NPSF}$ can be designed to sharpen the images while retaining the noise level and texture same as that of the input, as known in the art. For fair comparison, the NPSF was also trained when $\beta$ was set as $\beta_{TMGAN}$ such that noise in the NPSF results could be comparable with TMGAN results.

19

TABLE 2

Test exams for TMGAN. In table 2, T1 stands for "test," T2 stands for "training," "Stnd." stands for "standard," and "# E" stands for number of exams.

| Data set | Type | Voltage (kVp) | Current (mA) | Focal spot | DFOV (cm) | Recon kernel | # E | Evaluation |
|---|---|---|---|---|---|---|---|---|
| T1 Clean | Clinical | 80-140 | 40-1080 | small/ large/ extra large | ~40 | DLIR | 10 | NA |
| Clean high reso- lution | Head phan- tom | 120 | 320 | Small | 15 | Bone+ | 4 | NA |
| Noise | Water phan- tom | 120 | 350 | small | 40 | Stnd. | 3 | NA |
| Tex- ture | Water phan- tom | 120 | 280 | small | 40 | Stnd. | 3 | NA |
| T2 Exam 1 | Clinical body | 80 | 375 | extra large | 31.1 | Stnd. | 1 | Visual appeal |
| Exam 2 | Clinical body | 100 | 220 | small | 49.2 | Stnd. | 1 | Visual appeal |
| Exam 3 | Clinical body | 120 | 110 | small | 35 | Stnd. | 1 | Visual appeal |
| Exam 4 | Clinical body | 120 | 350 | small | 39.4 | Stnd. | 1 | Visual appeal |
| Exam 5i-5x | Clinical body | 80-140 | 40-1080 | small/ large/ extra large | 31.1-49.2 | DLIR | | PSNR, SSIM |
| Exam 6 | Clinical body | 120 | 530 | extra large | 15 | Bone+ | | Visual appeal |
| Noise 1 | Water phan- tom | 120 | 350 | small | 40 | Stnd. | 1 | NPS, PSNR |
| Noise 2 | Water phan- tom | 120 | 350 | small | 15 | Bone+ | 1 | NPS |

To demonstrate that the TMGAN can achieve the target texture in the results, the TMGAN results were compared for a water phantom scan (noise 2) with increasing λ. Since soft tissues are mostly made of water, a water phantom scan can be representative of noise texture in CT scans. FIG. 5. illustrates 1D NPS for various TMGAN results. Graph 500 illustrates the NPS for the TMGAN results with increasing λ and constant σ. Graph 500 illustrates at 502, the NPS for the target texture, at 504, the NPS for the input to the TMGAN, at 506, the NPS for a result of the TMGAN with λ=0, at 508, the NPS of a result of the TMGAN with λ=0.01, and at 510, the NPS of a result of the TMGAN with λ=0.04. In this experiment, an input to the generator was a water phantom reconstructed with Bone+kernel and DFOV of 15 cm. On the other hand, the target texture (real input provided to the discriminator in training) was taken from a water phantom reconstructed with a standard kernel and DFOV of 15 cm. The NPS for images reconstructed with Bone+ and standard reconstruction kernel can differ significantly, which can be evident from FIG. 5 (orange and green lines). Despite this difference, with λ=0.04 the NPS of the TMGAN result can closely match the target NPS. Furthermore, the NPS for λ=0 is skewed toward the lower frequencies, which causes the over-smooth or "cartoony" texture in CT image. As A increases, there is more emphasis on texture quality in the generator loss function, and hence the texture in the TMGAN results can be expected to match the target texture more accurately. This is consistent with the results shown in FIG. 5.

20

Figure 6:
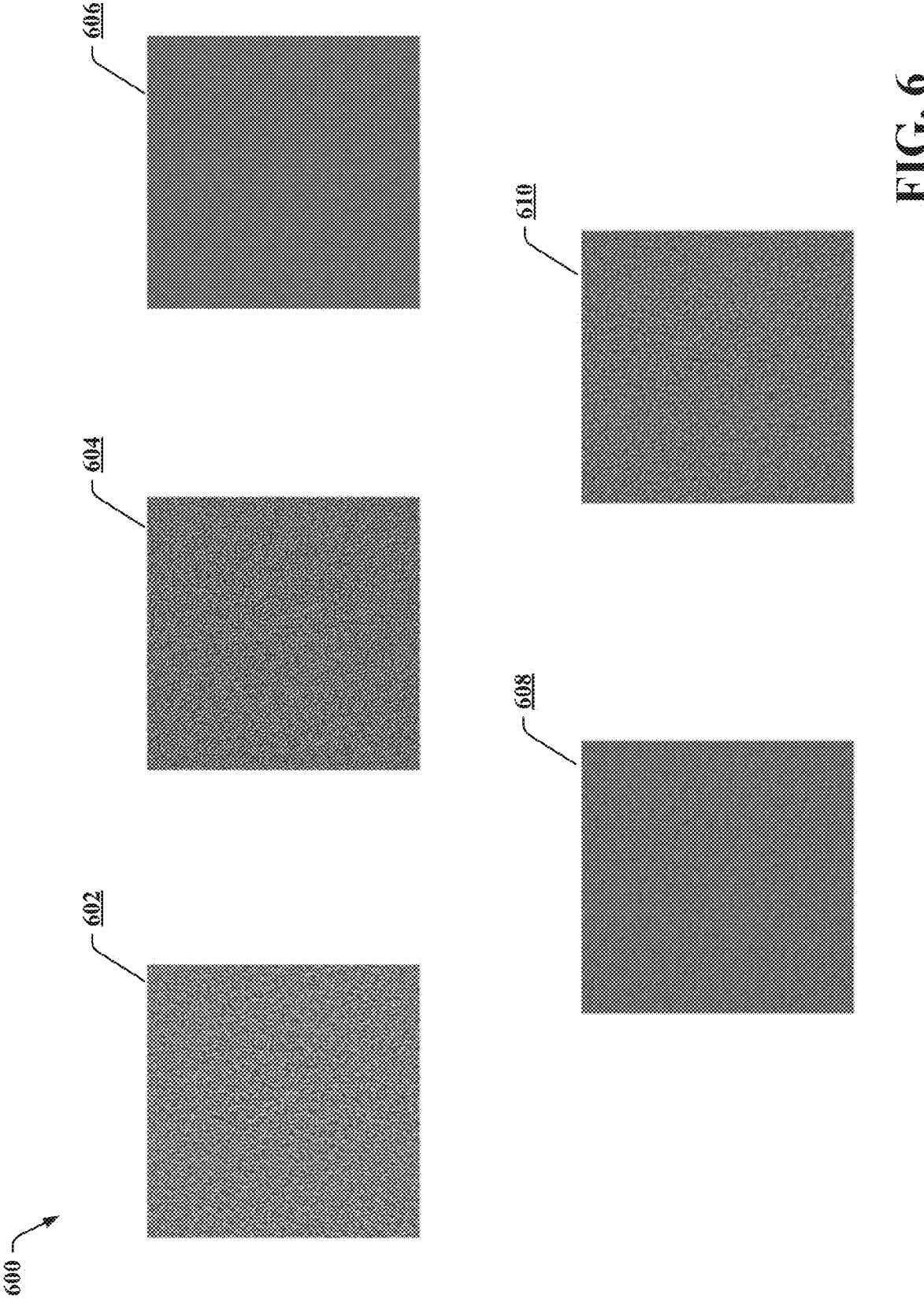
FIG. 6 illustrates example, non-limiting images of textures corresponding to the graph of FIG. 5 in accordance with one or more embodiments described herein.

In other words, with increasing λ, a shape of the NPS for the results becomes more similar to the NPS of the real or target texture, and a texture in the results can become more similar to the real or target texture, visually. Thus, graph 500 illustrates that a noisy input (orange line) can be driven to the results of the TMGAN for λ=0.04 (red line) by the TMGAN discussed in various embodiments, wherein the red line can indicate results that can be very close to the target texture (green line). Despite a significant difference between the noisy input and the target texture, the TMGAN network can match the difference in textures to output a resultant image (e.g., CT image) that can be close to the target texture. FIG. 6 illustrates deblurring results corresponding to graph 500.

Figure 8:
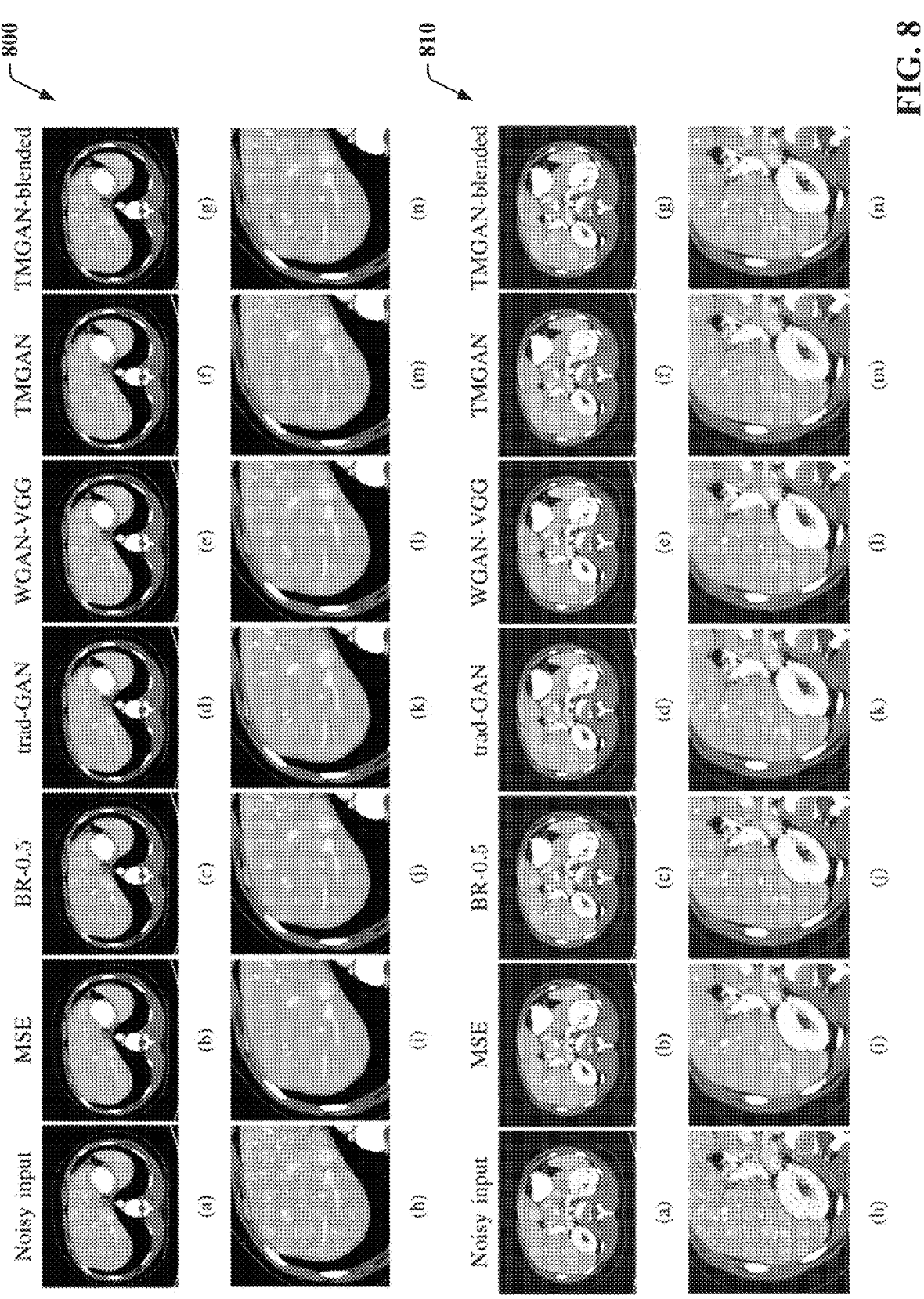
FIGS. 8-10 illustrate example, non-limiting image sets showing a comparison between performance of a TMGAN and other models for preserving textural information of images during clinical exams in accordance with one or more embodiments described herein.

TMGAN results for clinical exams are also presented in subsequent figures. FIG. 8 illustrates results for a high contrast clinical scan, referred to as exam 1. The figure illustrates that MSE results can have very smooth texture and less detail. Further, BR-0.5 can recover the detail, however, the texture can be very non-uniform. The trad-GAN and WGAN-VGG can recover some texture and detail. However, their texture can also be non-uniform and not pleasing. From the slices in FIG. 8, it can be evident that the TMGAN can produce very uniform texture in the results. However, few details can become masked in the texture. The arrows in FIG. 8 indicate details that TMGAN-blended results could recover while maintaining the uniform and pleasing texture features of the TMGAN. It is to be appreciated that these detail could only be recovered by BR-0.5 and consequently by the TMGAN-blended. The zoomed area in FIG. 8 illustrates that only the TMGAN and the TMGAN-blended could produce uniform texture while denoising the challenging slice.

Figure 9:
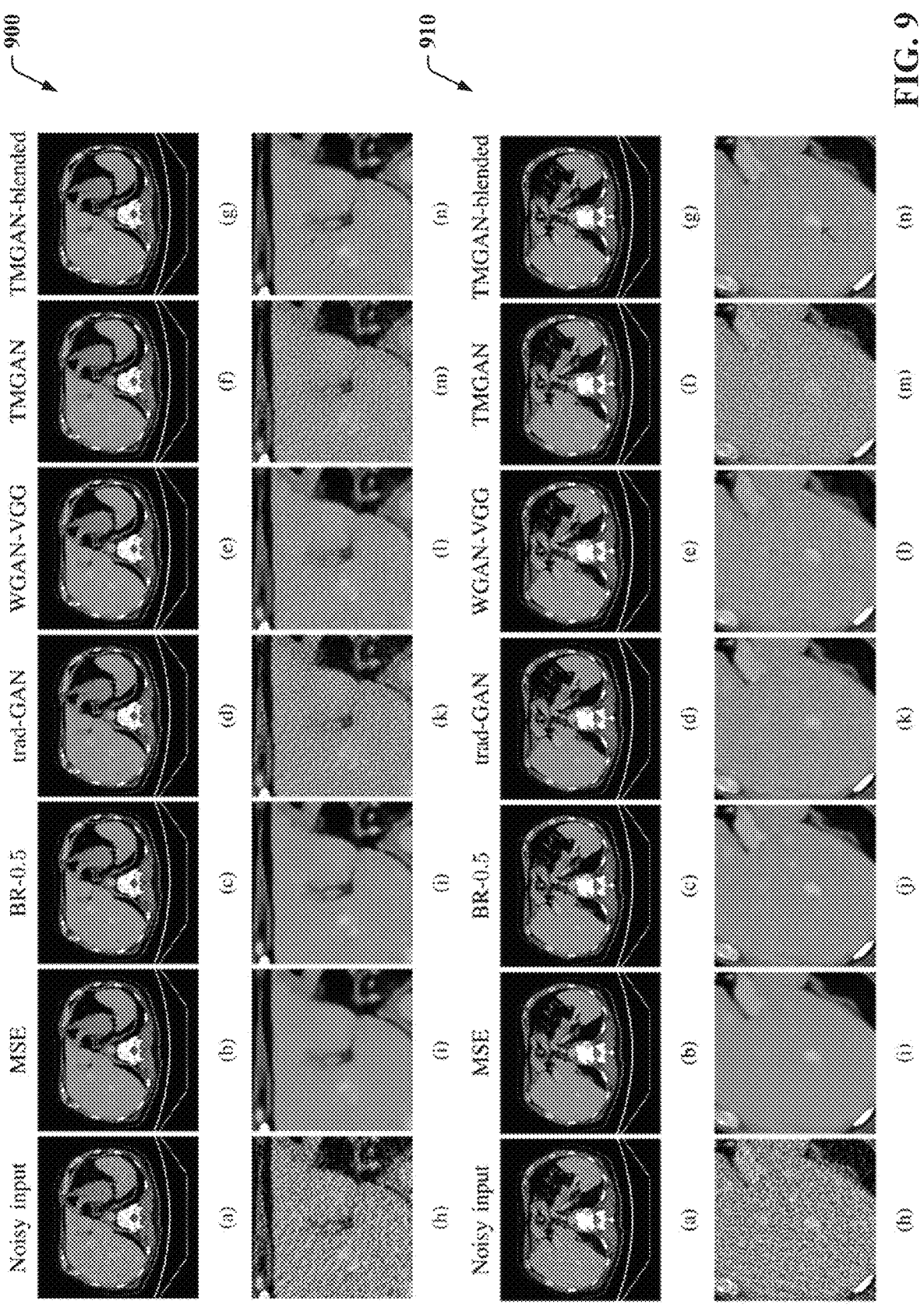
Figure 10:
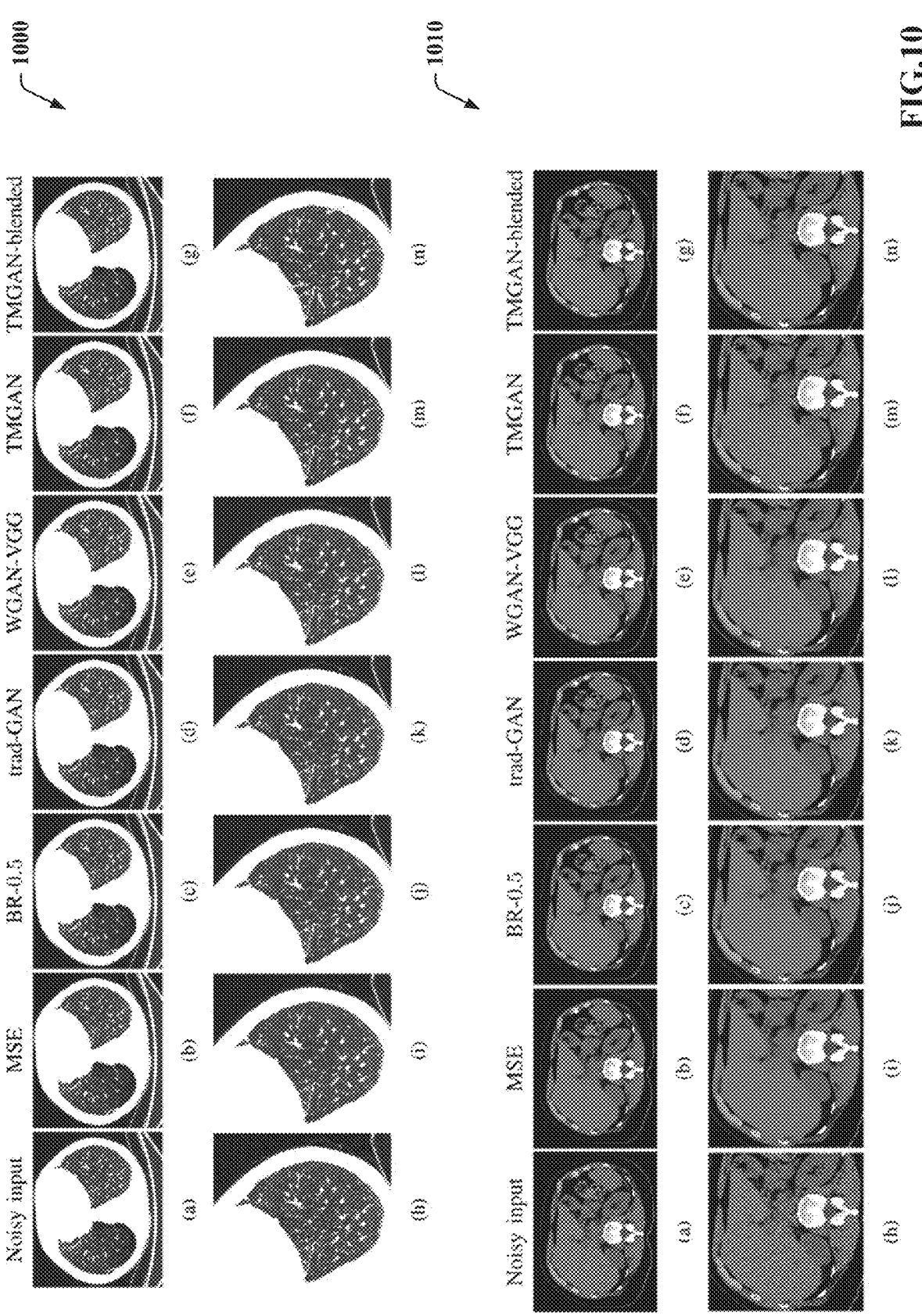

In FIG. 9, image set 900 and image set 910 illustrate results for a low-contrast clinical exam, exam 2. Both the full slice and zoomed views show that the TMGAN can produce uniform and target textures for low-contrast exams too, whereas the trad-GAN and WGAN-VGG could produce desirable textures to some extent. Further, the arrows in FIG. 9 illustrate that low-contrast-detectability can be best for TMGAN-blended results. FIG. 10 illustrates a clinical lung exam. Note that the small air pockets in lungs, shown by yellow arrows in image set 1000 have diagnostic value. These air pockets are not clearly visible in MSE and trad-GAN results. On the other hand, WGAN-VGG, BR-0.5, TMGAN and TMGAN-blended could recover them in the denoised images. FIG. 10 (image set 1010) corresponds to a challenging exam due to the contrast being very low. As seen in FIG. 10, the TMGAN-blended could produce the target texture and recover some detail, however, not completely. WGAN-VGG could recover more detail, however, the texture is not pleasing.

FIG. 6 illustrates, at 600, example, non-limiting images of textures corresponding to the graph of FIG. 9 in accordance with one or more embodiments described herein. Repetitive description of like elements and/or processes employed in respective embodiments is omitted for sake of brevity.

FIG. 6 illustrates the NPS for the TMGAN results with increasing λ and constant σ. FIG. 6 illustrates at 602, the NPS for the target texture (water phantom with standard filter recon; wprealtexture), at 604, the NPS for the input to the TMGAN (water phantom with Bone+ filter recon; wpinput), at 606, a result of the TMGAN λ=0 (lam0), at 608, a result of the TMGAN with λ=0.01 (lam001), and at 610, a result of the TMGAN with λ=0.04 (lam004). The display window is [−175, 175] HU.

FIG. 6 illustrates a slice from the water phantom volumes used to compute the NPS of FIG. 5. A difference in the texture appeal of FIG. 6 (wpinput) and the real or target texture (wprealtexture) can be apparent, which can correspond to orange and green lines in FIG. 5, respectively. FIG. 6 (lam0) illustrates the resulting flat texture when A is set to 0, and as A is increased, the texture in the TMGAN results becomes more similar to the target texture as evident from FIG. 6 (lam004). The values (noise std values) presented for respective slices below list sample standard deviation (std) computed using various uniform areas in the respective volumes. The decrease in the noise std from FIG. 6 (wpinput) to (lam004) can indicate that the TMGAN can reduce noise level while spectrally shaping the noise.

With continued reference to FIG. 5, a noisy input (e.g., input image) to the TMGAN can be represented by the orange line in graph 500, and a desired texture can be represented by the green line in graph 500. Graph 500 clearly illustrates that the TMGAN can match the texture in the results (e.g., of the TMGAN generator) to a desired texture. For deblurring an image, the noisy input can be reconstructed with a Bone+ kernel, and the desired texture can be reconstructed with a standard recon kernel. Thus, the NPS for the input image (orange line) is significantly different from that of the desired texture (green line). Despite the difference, the NPS of the sharpened TMGAN result could match the NPS of the desired texture with $\lambda=0.04$.

At 600, texture 602 can correspond to the green line (502) of graph 500 (Noise std: 30.42 HU) and represent a target texture, texture 604 can correspond to the orange line (504) of graph 500 (Noise std: 70.20 HU) and represent the input texture, texture 606 can correspond to the black line (506) of graph 500 (Noise std: 6.14 HU) and represent a texture corresponding to $\lambda=0$ for the TMGAN, texture 608 can correspond to the pink line (508) of graph 500 (Noise std: 8.32 HU) and represent a texture corresponding to $\lambda=0.01$ for the TMGAN, and texture 610 can correspond to the red line (510) of graph 500 (Noise std: 20.55 HU) and represent a texture corresponding to $\lambda=0.04$ for the TMGAN. Images illustrated in FIG. 6 can also demonstrate a performance of NPS in terms of correct visualization of results.

Figure 7A:
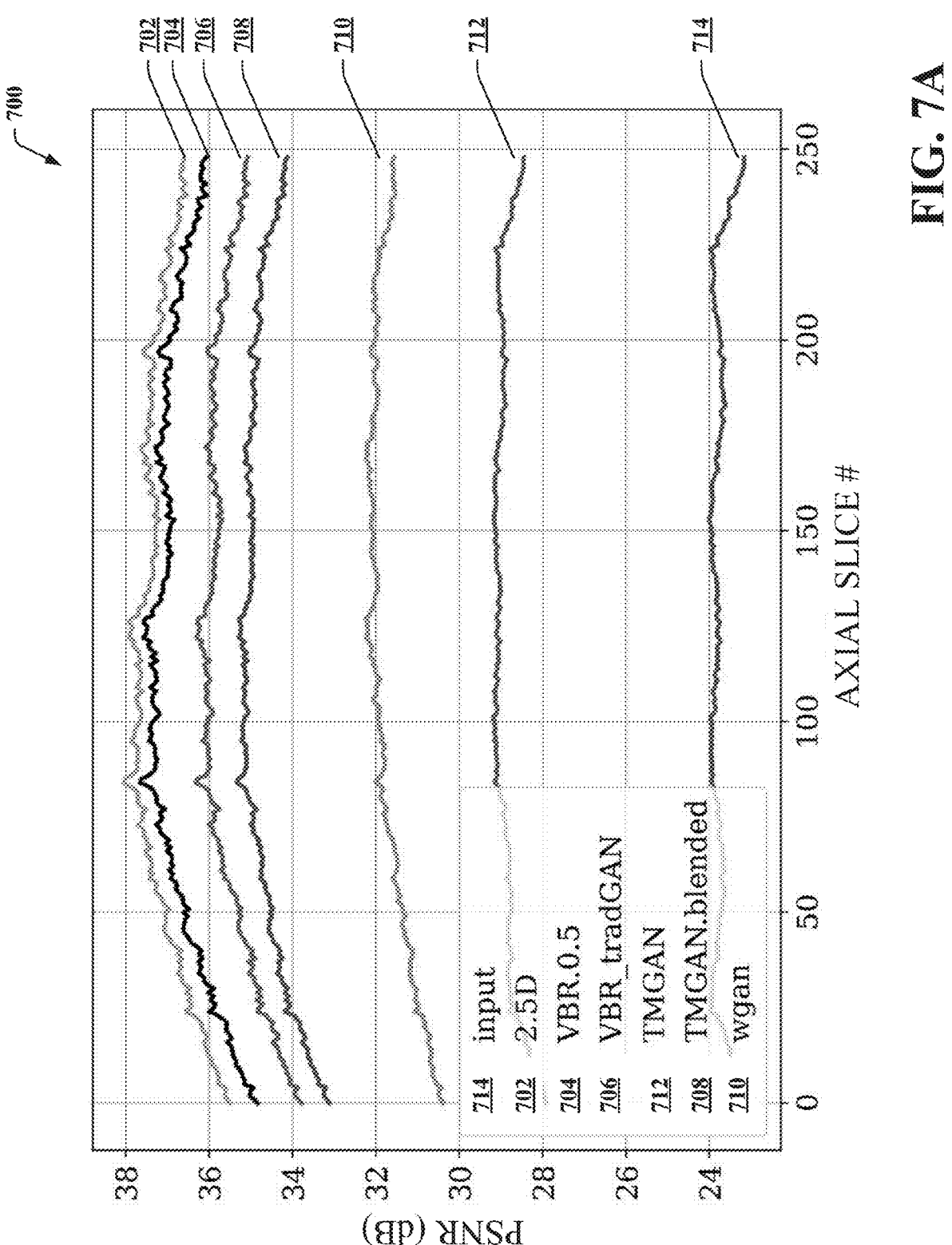
FIG. 7A illustrates an example, non-limiting graph showing a comparison of a slice-wise peak signal-to-noise ratio (PSNR) for different algorithms in accordance with one or more embodiments described herein.

FIG. 7A illustrates an example, non-limiting graph 700 showing a comparison of a slice-wise PSNR for different algorithms in accordance with one or more embodiments described herein. Repetitive description of like elements and/or processes employed in respective embodiments is omitted for sake of brevity.

FIG. 7A illustrates a comparison of slice-wise PSNR for exam 5i and demonstrates that the TMGAN-blended can preserve texture of an image with a small reduction in PSNR. In graph 700, lines 702, 704, 706, 708, 710, 712, and 714 illustrates PSNR plots associated with different algorithms, as identified in the legend. For example, graph 700 illustrates a comparison of the resulting image slice-wise PSNR for the input image, 2.5D, VBR.0.5, VBR_tradGAN, WGAN, the TMGAN denoiser, and the blended TMGAN. Since the TMGAN can recover texture, a reduction in the PSNR relative to the MSE and BR methods can be expected. However, a reduction of 8 dB, as seen in FIG. 7A, might be too large for clinical applications. Therefore, the TMGAN result ($M_1$) was blended with the result of ($M_0$) as follows. If $\eta$ is a blending ratio, then the blended result $M_B$ is given as $M_B=\eta \times M_1+(1-\eta)M_0$. It is evident that the blended result displays higher PNSR, while retaining some of the texture qualities of the TMGAN method.

Ideally, $\lambda$ and $\sigma$ can be tuned to achieve a desired balance of texture and image detail. However, fine tuning can be time consuming and require retraining with each setting. In various embodiments, a blending scheme (as needed) can be implemented after retraining the TMGAN generator for reasonable values of $\lambda$ and $\sigma$. In the experiments conducted in connection with the various embodiments, the results of the TMGAN were blended with $\lambda > 0$ ($h_\phi(\cdot)$) and with $\lambda=0$ according to a suitable blending ratio. The TMGAN with $\lambda=0$ can represent a bias reducing network ($h_{BR-\alpha}$ (y)). During blending, if $\eta$ can be the blending ratio, then the blended results can be given by equation 6.

$$\hat{x}^{(TMGAN-blended)}=\eta h_\phi(y)+(1-\eta)h_{BR-\alpha}(y) \qquad \text{Equation 6:}$$

Graph 700 can illustrate results for exam 5i, which can demonstrate that a blended TMGAN can produce texture at the cost of a decrease in PSNR. To confirm the structural fidelity of the TMGAN, the PSNR was computed for denoised results with respect to ground truth data. The axial slice-wise PSNR is reported as shown in graph 700. In graph 700, line 714 represents noisy input, line 702 represents MSE results, and line 712 represents results of the TMGAN. The MSE results display a higher PSNR, as expected, and this can be further described by equation 7. As described elsewhere, the bias reduction results can have a slightly lower PSNR. Since the TMGAN can recover more texture, it was expected that the PSNR can reduce further, however, a reduction of 8 decibels (dB) can be too large for clinical applications. Thus, the TMGAN results were blended with bias reduction results, resulting in the curve represented by line 708 with improved PSNR. Therefore, the TMGAN can recover texture, but need blending to maintain the structural fidelity.

$$PSNR(x) = 10\log_{10}\left(\frac{1000^2}{MSE(x)}\right) \qquad \text{Equation 7}$$

In equation 7, $$MSE(x) = \frac{1}{V}\sum_{i=1}^{V}(x(i) - x_{GT}(i))^2,$$

and V can represent the total number of voxels.

The clinical exams discussed above do not have respective ground truth. Therefore, for quantitative analysis, synthetic noisy exams were used. FIG. 7 illustrates axial slice-wise PSNR for the input, the MSE, the BR-0.5, the trad-GAN, the WGAN-VGG, the TMGAN and the TMGAN-blended. Since the MSE cost function is designed to optimize the PSNR, it can achieve the best PSNR. Texture and detail recovery causes a slight decrease in PSNR for BR-0.5 compared to MSE. Since the GAN architectures, trad-GAN, WGAN-VGG, TMGAN are rigorously trained to recover the texture, further reduction in the PSNR relative to the MSE and BR methods can be expected. FIG. 7 illustrates that the TMGAN blended result has higher PNSR, while retaining desirable qualities of texture of the TMGAN method.

To verify the robustness of the proposed method, a quantitative analysis was performed with 10 different clinical low-dose exams, referred to as exam 5i-5x. The exams were reconstructed using GE's TrueFidelity DLIR technology and the images generated were used as clean ground truth. Thereafter, noise was added from water phantom to create synthetic noisy exams. Next, PSNR and SSIM were computed for denoised images using various algorithms compared herein. Table 3 shows that the BR-0.5 has the best SSIM value. However, TMGAN-blended results produce much nicer texture with only a slight decrease in the PSNR and SSIM.

Table 3 presents results for exams 5i-5x based on an average PSNR and SSIM. A PSNR and SSIM comparison was performed for synthetic noise exams over ten exams. It can be observed that BR-0.5 has the best SSIM value. However, TMGAN-blended results can produce a better texture with only a slight decrease in the PSNR and SSIM. In table 3, $\mu$: mean and $\sigma$: std.

TABLE 3

Comparison of PSNR and SSIM for 10 synthetic test exams

| Method | PSNR ($\mu \pm \sigma$) | SSIM ($\mu \pm \sigma$) |
|---|---|---|
| Input | 23.74 ± 0.01 | 0.70 ± 0.07 |
| MSE | 37.20 ± 0.77 | 0.81 ± 0.09 |
| BR-0.5 | 36.85 ± 0.81 | 0.82 ± 0.08 |
| trad-GAN | 35.94 ± 0.83 | 0.81 ± 0.08 |
| WGAN-VGG | 30.75 ± 0.56 | 0.77 ± 0.09 |
| TMGAN | 28.98 ± 0.18 | 0.74 ± 0.08 |
| TMGAN-blended | 34.87 ± 0.58 | 0.79 ± 0.09 |

Figure 7B:
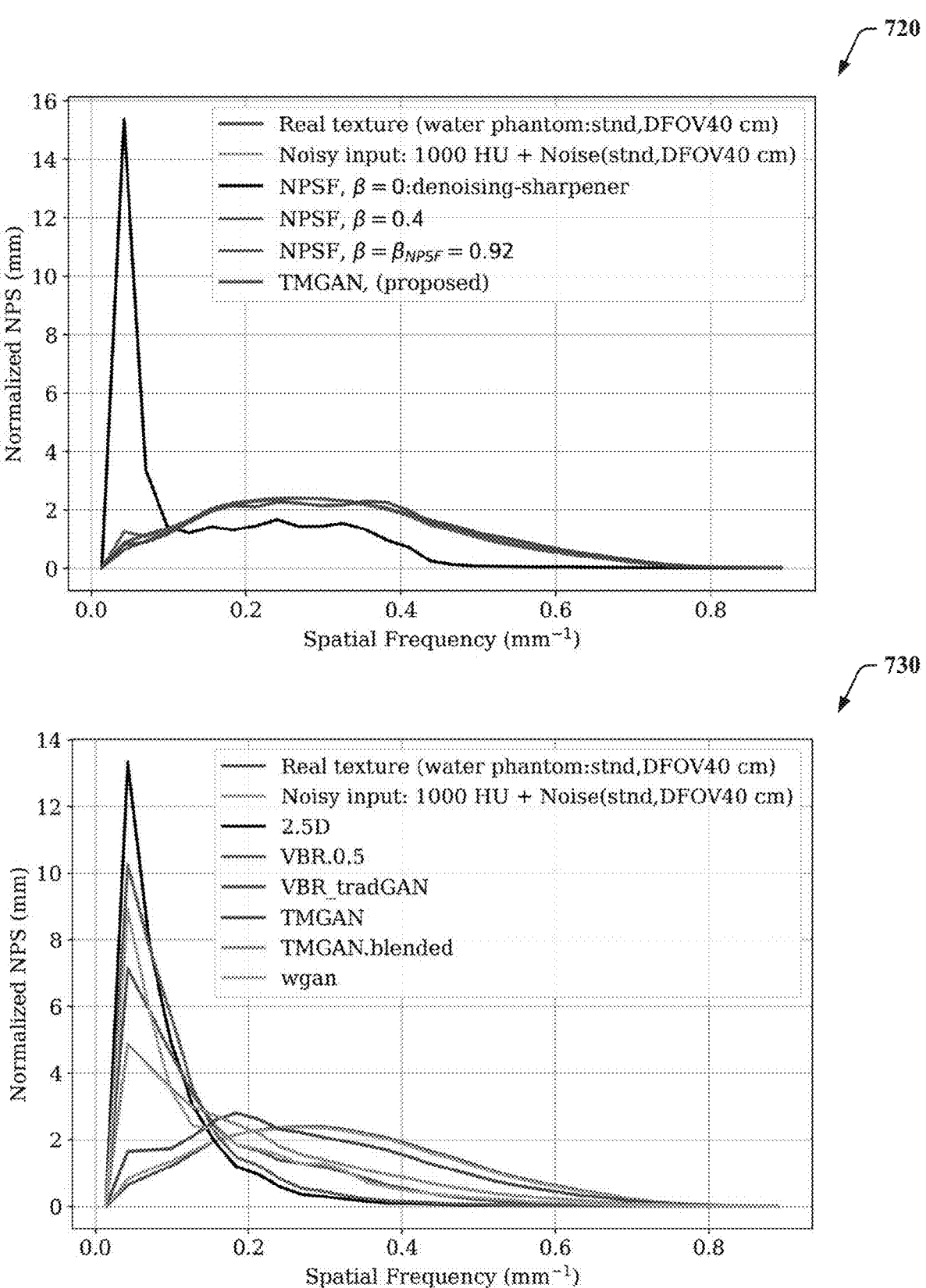
FIG. 7B illustrates example, non-limiting graphs showing a comparison of denoised and deblurred results in accordance with one or more embodiments described herein.

FIG. 7B illustrates example, non-limiting graphs 720 and 730 showing a comparison of denoised and deblurred results in accordance with one or more embodiments described herein. Repetitive description of like elements and/or processes employed in respective embodiments is omitted for sake of brevity.

In FIG. 7B, graph 720 can illustrate a comparison of NPS for deblurred results. More specifically, graph 720 illustrates a comparison of NPS for a deblurred water phantom using algorithms discussed herein. It is evident that the NPS for the denoising-sharpener is skewed towards low frequencies supporting the over-smooth texture observed in FIG. 11. Graph 720 can show that the TMGAN and the NPSF ($\beta$>0) match the NPS of results to the real/target texture. The NPS for NPSF and TMGAN results can be very similar and they can match with the target texture.

Graph 730 can illustrate a comparison of NPS for denoised results. The TMGAN can produce a closest match with the NPS of the real or the target texture. The TMGAN-blended can offer one of the best results. An NPS for the TMGAN-blended can be slightly skewed towards the origin while preserving higher frequencies. Graph 730 illustrates the NPS for denoised results. Here again, the NPS was computed for a denoised water phantom (noise 1) with various algorithms compared. As evident from FIG. 7B, NPS for TMGAN results matches more closely with the real or target texture compared to other methods. The NPS for TMGAN-blended results, which was found to be the best based on various evaluations, has slightly higher low frequencies compared to TMGAN. Further, the NPS at higher frequencies with TMGAN-blended can match more closely to the real texture compared to other techniques, except the TMGAN.

The experiments conducted in connection with the various embodiments herein can demonstrate that the TMGAN can produce a desired texture in the results while also denoising or deblurring. By optimizing and tuning the TMGAN results in the future, it can be possible to remove the need for blending. Other improvements can also be possible through hyperparameter tuning for both denoising and deblurring, and also through selection of textures used for training the network.

Figure 11:
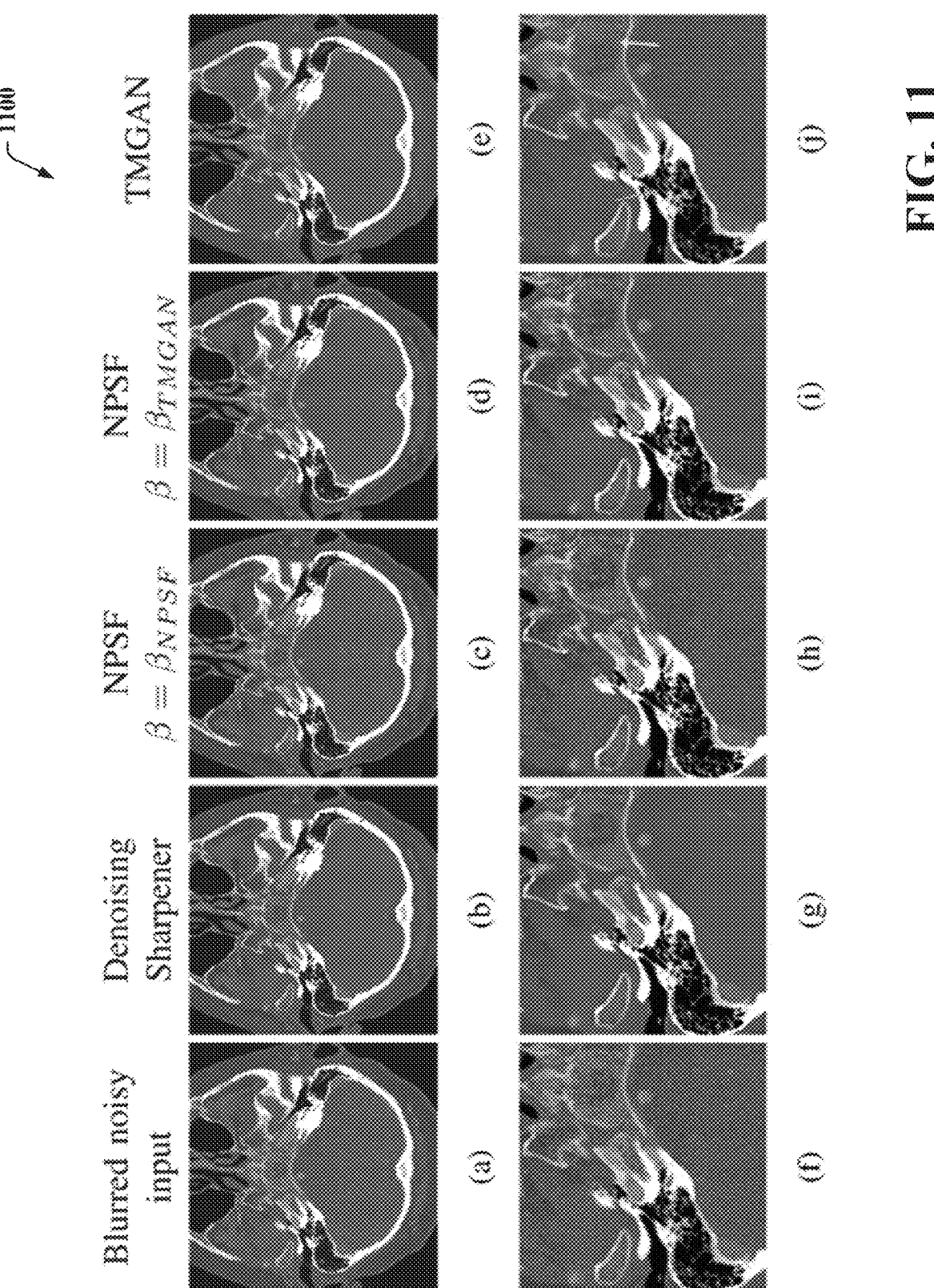
FIG. 11 illustrates an example, non-limiting image set showing a comparison between performance of a TMGAN and other models for denoising an image during a clinical exam in accordance with one or more embodiments described herein.

Next, TMGAN results for denoising real clinical exams are presented. The TMGAN results can demonstrate that the TMGAN can produce uniform texture while also denoising. As expected from the PSNR plots in FIG. 7, the TMGAN results are a little noisy for clinical applications, whereas the blended TMGAN results retain much of the nice texture of the TMGAN images at a lower noise level. In clinical reviews, the blended TMGAN results were appreciated by clinical personnel for the uniformity of the texture and reduction in streaking. Results show that the blended TMGAN can recover structures in a lung while producing desirable texture. FIG. 11 shows TMGAN results for sharpening an image consisting of noise and aliasing artifacts. Moreover, the TMGAN results for $\lambda$=0 are included since they are representative of what can be expected when using only an MSE loss function. NPSF results of a study designed to sharpen images while retaining the texture were also compared. From FIG. 11, it is evident that the TMGAN $\lambda$=0 results are too smooth and contain artifacts. While the NPSF results have more detail and texture, they retain some aliasing artifacts. In comparison, the TMGAN results are sharper than the input and have more uniform texture with a lower noise level than NPSF. Moreover, the TMGAN results have reduced aliasing artifacts while remaining sharp.

FIGS. 8-11 illustrate results of clinical exams 1, 2, 3, 4 and 6 corresponding to Table 2. FIGS. 8-11 illustrate a comparison of results from various algorithms, wherein the various algorithms were used as benchmarks for comparison with results of the TMGAN. Herein, the algorithms trad-GAN (traditional GAN) can refer to a basic GAN comprising one generator network and one discriminator network, for example, as opposed to a Siamese network of the TMGAN of the various embodiments discussed herein, and wherein the WGAN-VGG can refer to a Wasserstein GAN-Visual Geometry Group for CT denoising using GAN. The trad-GAN and WGAN-VGG are known in the art.

FIG. 8 illustrates example, non-limiting image sets 800 and 810 showing a comparison between performance of a TMGAN and other models for preserving textural information of an image during a clinical exam in accordance with one or more embodiments described herein. Repetitive description of like elements and/or processes employed in respective embodiments is omitted for sake of brevity.

Image sets 800 and 810 respectively comprise images (a)-(n) presented row-wise, and images in a column correspond to the model name listed as the heading for that column. Image set 800 illustrates a comparison of denoised results for low-dose clinical exam 1. The first row in image set 800 shows a full slice, and the second row shows a zoomed region of interest (ROI). The display window is [−125, 225] HU. It can be evident from image set 800 that BR-0.5 results can maintain good detail, while the TMGAN can produce a target texture that can be more uniform and pleasing compared to other methods. With blending, detail (red arrows) can be preserved from BR-0.5 and target texture in TMGAN. Image set 810 illustrates a comparison of denoised results for the low-dose clinical exam 1. The first row in image set 810 shows a full slice, and the second row shows a zoomed ROI. The display window is [−125, 225] HU. It can be evident from image set 810 that the TMGAN-blended can produce a target texture for a challenging input with very non-uniform texture.

Image set 800 illustrates details and texture uniformity in images of a liver in results of clinical exam 1. Texture can be very important in images of the liver. The TMGAN can produce a uniform texture with good detail in denoised results. As expected from the PSNR plot of graph 700, the TMGAN can denoise an image, however, the image can still comprise some noise. The blended results can further reduce the noise and retain a good texture (i.e., best of both worlds). Image set 810 illustrates another slice from clinical exam 1 (real clinical exam). Texture can be very important in images of the liver. Here, the texture can be very non-uniform. For clinical exam 1, the following parameters were applicable: BR (BR algorithm):α=0.5, TMGAN: α=0.5, α=7.8, λ=0.4, and η=0.4.

FIG. 9 illustrates example, non-limiting image sets 900 and 910 showing a comparison between performance of a TMGAN and other models for preserving textural information of an image during a clinical exam in accordance with one or more embodiments described herein. Repetitive description of like elements and/or processes employed in respective embodiments is omitted for sake of brevity.

Image sets 900 and 910 respectively comprise images (a)-(n) presented row-wise, and images in a column correspond to the model name listed as the heading for that column. Image set 900 illustrates a comparison of slice 1 of denoised results for the low-dose low-contrast clinical exam 2. In image set 900, the first row shows a full slice, and the second row shows a zoomed ROI. The display window is [−125, 225] HU. It can be evident from image set 900 that BR-0.5 results can maintain good detail, while the TMGAN can produces a target texture that can be more uniform and pleasing as compared to other methods. With blending, detail (red arrows) can be preserved from BR-0.5 and favorable texture can be generated by the TMGAN. Image set 910 illustrate a comparison of slide 2 of denoised results for the low-dose low-contrast clinical exam 2. In image set 910, the first row can show a full slice, and the second row can show a zoomed ROI. The display window is [−125, 225] HU. It can be evident from image set 910 that BR-0.5 results can maintain good detail, while the TMGAN can produce a target texture that can be more uniform and pleasing as compared to other methods. With blending, detail (red arrows) can be preserved from BR-0.5 and favorable texture can be generated by the TMGAN.

Image set 900 illustrates low-contract detectability (LCD) and texture uniformity in results of clinical exam 2. LCD can be defined as the ability of a CT system to detect a certain sized object whose density is slightly different from its background under certain dose conditions. Texture can be very important in images of the liver. As evident from the images, the TMGAN can generate better LCD with a pleasant texture. As expected from the PSNR plot of graph 700, the TMGAN can denoise an image, however, the image can still comprise some noise. The blended results can further reduce the noise and retain a good texture (i.e., best of both worlds). Image set 910 illustrates another slice from clinical exam 2 (real clinical exam). Texture can be very important in images of the liver. Here, the texture can be very non-uniform. For clinical exam 2, the following parameters were applicable: BR (BR algorithm): α=0.5, TMGAN: α=0.5, α=7.8, λ=0.4, and η=0.4.

FIG. 10 illustrates example, non-limiting image sets 1000 and 1010 showing a comparison between performance of a TMGAN and other models for preserving textural information of an image during clinical exams in accordance with one or more embodiments described herein. Repetitive description of like elements and/or processes employed in respective embodiments is omitted for sake of brevity.

Image sets 1000 and 1010 respectively comprise images (a)-(n) presented row-wise, and images in a column correspond to the model name listed as the heading for that column. Image set 1000 illustrates a comparison of denoised results for the low-dose clinical lung exam 3. In image set 1000, the first row shows a full slice, and the second row shows a zoomed ROI. The display window is [−1200, −200] HU. It can be evident from image set 1000 that the BR-0.5 results can maintain good detail, while the TMGAN can produce a target texture that can be more uniform and pleasing as compared to other methods. With blending, detail (small air pockets indicated by yellow arrows) can be preserved by the BR-0.5 and nice texture can be generated by the TMGAN. Image set 1010 can illustrate a comparison of denoised results for the low-dose exam 4. In image set 1010, the first row shows a full slice, and the second row shows a zoomed ROI. The display window is [−125, −225] HU. It can be evident from image set 1010, that the TMGAN-blended can produce a target texture for a challenging input with very non-uniform texture.

Image set 1000 illustrates images of a lung from results of clinical exam 3. Texture can be very important in images of the liver. As evident from the images, the TMGAN can recover small air pockets in denoised images. For clinical exam 3, the following parameters were applicable: BR (BR algorithm): α=0.5, TMGAN: α=0.5, α=7.8, λ=0.4, and η=0.4.

Image set 1010 can illustrate LCD and texture uniformity in images from clinical exam 4 (real clinical exam). As evident, the TMGAN can generate a better LCD with a pleasant texture. For clinical exam 4, the following parameters were applicable: BR (BR algorithm): α=0.5, TMGAN: α=0.5, α=7.8, λ=0.4, and η=0.4. As expected from the PSNR plot of graph 700, the TMGAN can denoise an image, however, the image can still comprise some noise. The blended results can further reduce the noise and retain a good texture (i.e., best of both worlds). Here, the texture can be very non-uniform.

FIG. 11 illustrates an example, non-limiting image set 1100 showing a comparison between performance of a TMGAN and other models for deblurring an image during a clinical exam in accordance with one or more embodiments described herein.

FIG. 11 illustrates TMGAN results for sharpening an image consisting of noise and aliasing artifacts. Image set 1100 comprises images (a)-(j) presented row-wise, and images in a column correspond to the model name listed as the heading for that column. Image set 1100 can illustrate a comparison of deblurred results for the exam 6. In image set 1100, the first row shows a full slice, and the second row shows a zoomed ROI. The display window is [−650, 1350] HU. It can be evident from image set 1100 that the TMGAN can sharpens temporal bones (green arrow), while reducing aliasing artifacts (yellow arrow). As evident from the images, for comparable noise levels, the TMGAN results can have fewer artifacts and more uniform texture.

As expected from the PSNR plot of graph 700, the TMGAN can denoise an image, however, the image can still comprise some noise. The blended results can further reduce the noise and retain a good texture (i.e., best of both worlds). Here, the texture can be very non-uniform. For clinical exam 6, the following parameters were applicable: BR (BR algorithm): α=0.5, TMGAN: α=0.5, α=7.8, λ=0.4, and η=0.4. As evident from the denoising results of the TMGAN illustrated in image set 1100, the results of the TMGAN do not have aliasing artifacts (green and yellow arrows in image (j)), indicating that the TMGAN can have a superior performance as compared to the benchmarks.

From FIG. 11, it is evident that the denoising sharpener results are over-smooth and contain artifacts. While the NPSF with $\beta=\beta_{NPSF}$ can generate more detail and texture, it can also retain some aliasing artifacts. If $\beta$ is reduced to $\beta_{TMGAN}$ for NPSF then, there can be partial noise reduction and sharpening. However, aliasing artifacts can look worse in this case. In comparison, the TMGAN results zare sharper than the input (green arrow) and have more uniform texture with a lower noise level than NPSF. As discussed above, the TMGAN results can have reduced aliasing artifacts while remaining sharp as indicated by the yellow arrow.

Figure 12:
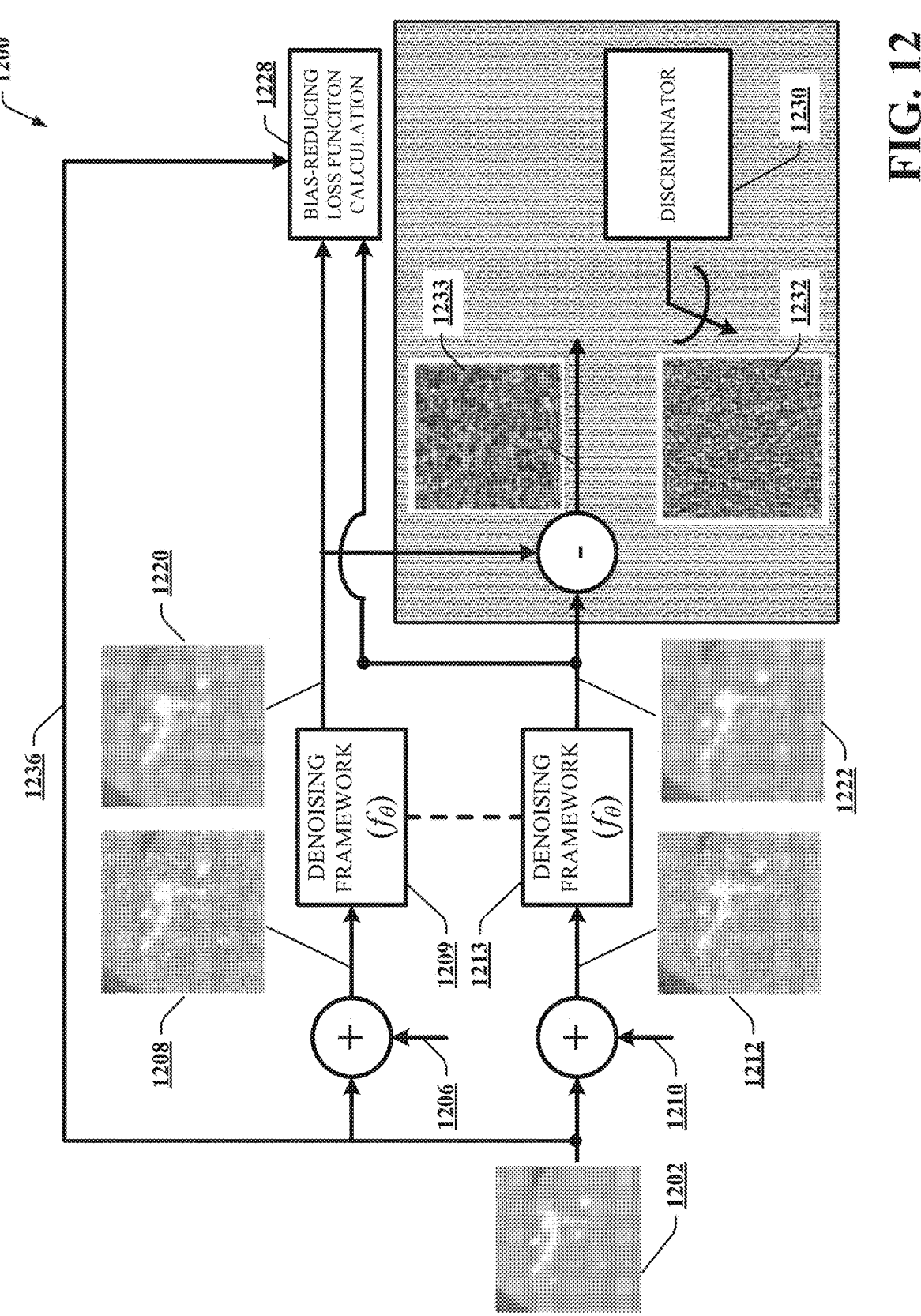
FIG. 12 illustrates a flow diagram of an example, non-limiting TMGAN employed for CT image enhancement in accordance with one or more embodiments described herein.

FIG. 12 illustrates a flow diagram of an example, non-limiting TMGAN 1200 employed for CT image enhancement in accordance with one or more embodiments described herein. One or more embodiments discussed with reference to FIG. 12 can be performed by one or more components of system 100 of FIG. 1. Repetitive description of like elements and/or processes employed in respective embodiments is omitted for sake of brevity.

With continued reference to FIG. 3, in various embodiments, a TMGAN can be employed towards achieving texture-rich enhanced CT images by matching a texture in the enhanced CT images to a desired texture. The TMGAN can comprise network architecture 300. Network architecture 300 of the TMGAN can enable separating (e.g., by noise separation component 112) anatomy from texture in the enhanced CT images during training (e.g., by training component 108) of the TMGAN, followed by matching the texture to desired example textures. For example, two independent noise samples can be added (e.g., by input component 110) to a ground truth image to generate two independent noisy samples of images that can be conditionally independent. Stated differently, the two independent noise samples can be added to the same ground truth image to generate two independent noisy samples of images that can be conditionally independent. The two independent noisy samples of images can be processed with a Siamese network (the generator of the TMGAN) to produce two conditionally independent estimates. A difference of the two conditionally independent estimates can be considered to acquire the texture part of the ground truth image and feed it to a discriminator of the TMGAN. The discriminator can score the texture produced by the generator against samples of a desired texture while training. Consequently, the generator can be trained to produce denoised or sharpened images with the desired texture.

More specifically, Y being an observed image (e.g., a CT image) from which an entity (e.g., a hardware, a software, machine, AI or a human entity) can aim to recover a true image X, and the forward model of equation 1 can be assumed towards formulation of a problem that can be addressed by various embodiments herein. In the forward model, it is assumed that the true image, X, can be deformed by a pass filter, G, and additive noise, W. In the forward model, G(X) can represent deformations in Y. As stated elsewhere herein, the pass filter, G, can depend on the application. For example, for sharpening applications, the pass filter can be a deblurring filter, and for denoising applications, the pass filter can be an identity operator. The estimator, $\hat{X}$, can be defined as a sum of the true image bias, $B_X$, and the noise, $\delta_X$ (e.g., as described by equation 2 or equation 8). The bias can be deterministic for a known X (e.g., $B_X=\mathbb{E}[\hat{X}|X]-X$), and the noise can be a random variable and a function of X (e.g., $\delta_X=\hat{X}-\mathbb{E}[\hat{X}|X]$). Existing algorithms can try to eliminate the noise, $\delta_X$, completely, producing over smooth results, however, in various embodiments of the present disclosure, the noise can be used in the estimate to train an algorithm to generate the noise with the desired texture distribution. However, as noted previously, $\delta_X$, cannot be observed directly.

$$\hat{X}=h(Y)=X+B_X+\delta_X \qquad \text{Equation 8:}$$

In various embodiments, a different of noise in the estimates can be observed by adding two independent noise samples to G(X), and creating two noisy inputs, $Y_1=G(X)+W_1$ and $Y_2=G(X)+W_2$, wherein $W_1$ and $W_2$ can be independent and identically distributed (i.i.d.). $W_1$ and $W_2$ can be Gaussian distributions, but they can be sampled independently. Father, two estimates can be generated for the two noisy inputs, wherein the two estimates can be $\hat{X}_1=h(Y_1)$ and $\hat{X}_2=h(Y_2)$, and wherein $Y_1$ and $Y_2$ can be conditionally independent and follow the same conditional distribution. The same can be true for $\hat{X}_1$ and $\hat{X}_2$. Thereafter, a difference of the two estimates can be generated (e.g., as described by equation 3 or equation 9), and the bias portion (e.g., $X+B_X$) being the same in both estimates, can get subtracted, leaving only the noise portion (e.g., $\delta_{X1}-\delta_{X2}$) that can be different for each estimate.

$$\hat{X}_1-\hat{X}_2=h(Y_1)-h(Y_2)=(X+B_X+\delta_{X1})-(X+B_X+\delta_{X2})=\delta_{X1}-\delta_{X2} \qquad \text{Equation 9:}$$

In various embodiments, it can be assumed that there exist $\{T_k\}_{k=1}^{K}$, which can be independent and identically distributed samples of the desired texture with symmetric distribution. Based on the assumption, in various embodiments, a distribution of a difference of the noise estimates (e.g., $\delta_{X1}-\delta_{X2}$) can be matched with a difference of desired texture samples (e.g., $T_1-T_2$) to achieve texture-rich enhanced images. In various embodiments, TMGAN 1200 can be employed to achieve the texture-rich enhanced images. The network architecture of TMGAN 1200 can take as input ground truth image 1202 (e.g., $x_k$) and filter ground truth image 1202 with the deformation expected in the application (e.g., denoising or sharpening). Two independent noise samples, 1206 (e.g., $w_{k,2}$) and 1210 (e.g., $w_{k,1}$) can be generated (e.g., by input component 110) and added to $G(x_k)$ to generate respective inputs, image 1208 (e.g., $y_{k,2}$) and image 1212 (e.g., $y_{k,2}$), for the TMGAN generator. That is, $x_k=k^{th}$ ground truth image and $w_{k,i}=i^{th}$ noise sample for $x_k$. For example, image 1208 can be an input to generator 1209 and image 1212 can be an input to generator 1213. The respective inputs comprising image 1208 and image 1212 can be passed through the TMGAN generator network to create two respective estimates, image 1220 and image 1222. For example, generator 1209 can generate image 1220 and generator 1213 can generate image 1222. A difference of the two estimates can be scaled with the parameter, $\gamma$, that can be introduced to compensate for an amplitude difference between a texture represented by the difference of the two estimates and a ground truth texture (e.g., desired texture). The $\gamma$ parameter can be estimated as part of the training process or it can be set manually. The scaled results can be a fake input for the TMGAN discriminator. For example, texture 1233 can be the fake input to discriminator 1230, and discriminator 1230 can also receive the difference of the desired texture samples, wherein the difference of the desired texture samples can constitute the real input. For example, texture 1232 can be the real input to discriminator 1230.

During training, discriminator 1230 can give a score of zero (0) for the fake texture and a score of 1 for the real texture, and the TMGAN generator can attempt to get a score of 1 from discriminator 1230 by producing more realistic texture differences (e.g., as the fake input). Hence, the discriminator loss function can be referred to as texture loss. To ensure that the results of TMGAN 1200 can comprise structural fidelity, for example, with respect to ground truth image 1202 (e.g., $x_k$), bias-reducing loss function 1228 can be included in the network architecture of TMGAN 1200. Bias-reducing loss function 1228 can introduce image fidelity loss. It can be demonstrated by techniques known in the art that the bias-reducing loss function can recover more structure in denoised images as compared to an MSE loss function. Image fidelity loss can compare image 1220 and image 1222 with ground truth image 1202, as illustrated by arrows travelling into the box of bias-reducing loss function 1228 from generator 1209 and generator 1213, and arrow 1236. An output of the bias-reducing loss function 1228 can be used to retrain the TMGAN generator.

The loss functions can be described mathematically, as follows. For discriminator 1230, binary cross entropy can be used, as is common for GAN training. The loss function for discriminator 1230 can be as described in equation 4, and the loss function for the TMGAN generator can be as described in equation 5.

Equation 4 can be written as:

$$d(\theta_g, \theta_d) = -\frac{1}{K}\sum\nolimits_{k=1}^{K}\log\{f_{\theta_d}(t_{k,1} - t_{k,2})\} + \log\left(1 - f_{\theta_d}(\gamma(\hat{x}_{k,1} - \hat{x}_{k,2}))\right)$$

Likewise, equation 5 can be written as:

$$g(\theta_g, \theta_d) =$$

$$\frac{1}{K}\sum\nolimits_{k=1}^{K} -\lambda\log\{f_{\theta_d}(\gamma(\hat{x}_{k,1} - \hat{x}_{k,2}))\} + \frac{1}{2\sigma^2}\{\|\hat{z}_{k,1} - x_k\|^2 + \|\hat{z}_{k,2} - x_k\|^2\},$$

wherein $\hat{Z}_{k,1} = \alpha\hat{X}_{k,1} + (1-\alpha)\,\hat{X}_{k,2}$, $\hat{Z}_{k,2} = (1-\alpha)\hat{X}_{k,1} + \alpha\hat{X}_{k,2}$, and the term $\{\|\hat{z}_{k,1} - x_k\|_2 + \|\hat{z}_{k,2} - x_k\|^2\}$ can be matched to the clean image.

In the loss function of discriminator 1230, discriminator 1230 can desire the first term (e.g., $\{f_{\theta_d}(t_{k,1} - t_{k,2})\}$) to be equal to 1, wherein the first term can be associated with real inputs, and the second term (e.g., $\{1 - f_{\theta_d}(\gamma(\hat{x}_{k,1} - \hat{x}_{k,2}))\}$) to be equal to zero (0), wherein the second term can be associated with fake inputs.

For the TMGAN generator (e.g., comprising generator 1209 and 1213) the first term in the loss function of the TMGAN generator (e.g., $\{f_{\theta_d}(\gamma(\hat{x}_{k,1} - \hat{x}_{k,2}))\}$) can be the discriminator score for the fake input (e.g., the fake texture represented by texture 1233), and the TMGAN generator can desire the first term to be equal to 1, and the first term in the loss function of the TMGAN generator can be described as the texture loss term. The second term in the loss function of the TMGAN generator (e.g., $\{\|\hat{z}_{k,1} - x_k\|^2 + \|\hat{z}_{k,2} - x_k\|^2\}$) can be the bias reducing loss function, as described previously. In the loss function of the TMGAN generator, A can control a relative importance of the texture and image fidelity, and a can denote a permissible deviation of estimates from $x_k$ in HU.

Thus, the network architecture of the TMGAN can separate noise and bias while training the estimator, and the TMGAN can produce texture-rich medical images. In various embodiment the filter can also be trained to match the distribution of the noise to a target texture. This way, a desired texture can be produced while enhancing CT images.

Figure 13:
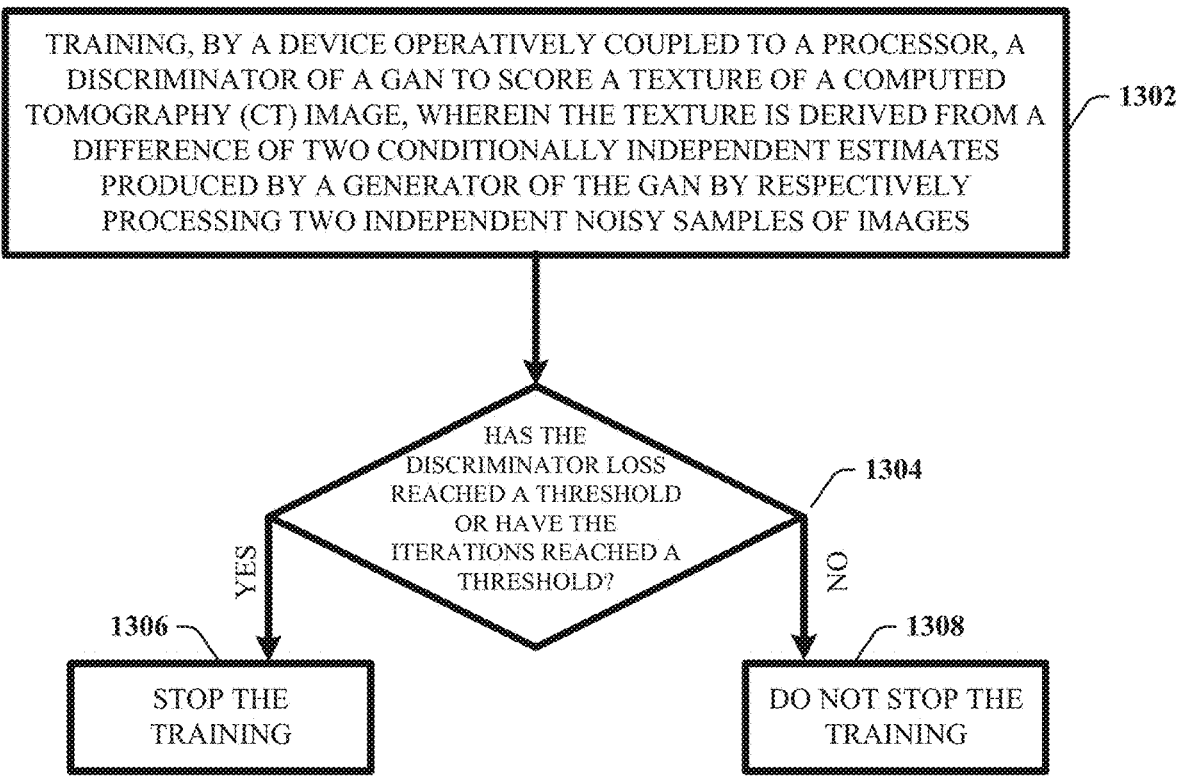
FIG. 13 illustrates a flow diagram of an example, non-limiting method that can be employed for CT image enhancement using a TMGAN in accordance with one or more embodiments described herein.

FIG. 13 illustrates a flow diagram of an example, non-limiting method 1300 that can be employed for CT image enhancement using a TMGAN in accordance with one or more embodiments described herein. One or more embodiments discussed with reference to FIG. 13 can be performed by one or more components of system 100 of FIG. 1. Repetitive description of like elements and/or processes employed in respective embodiments is omitted for sake of brevity.

At 1302, the non-limiting method 1300 can comprise training (e.g., by training component 108), by a device operatively coupled to a processor, a discriminator of a GAN to score a texture of a CT image, wherein the texture can be derived from a difference of two conditionally independent estimates produced by a generator of the GAN by respectively processing two independent noisy samples of images.

At 1304, the non-limiting method 1300 can comprise determining whether the discriminator loss has reached a threshold or if a threshold number of iterations have been reached.

If yes, at 1306, the non-limiting method 1300 can comprise stopping the training of the discriminator.

If no, at 1308, the non-limiting method 1300 can comprise continuing (e.g., by training component 108) the training of the discriminator.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively produce denoised CT images or deblurred CT images while ensuring that hallucinations are absent from the denoised CT images or the deblurred CT images as the one or more embodiments described herein can enable this process. And, neither can the human mind nor a human with pen and paper separate anatomical features from texture in a medical image during training and match the texture to a desired example texture, as conducted by one or more embodiments described herein.

In order to provide additional context for various embodiments described herein, FIG. 14 and the following discussion are intended to provide a brief, general description of a suitable computing environment 1400 in which the various embodiments described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies.

Thus, the communication can be a predefined structure as with a conventional network or simply an ad hoc communication between at least two devices.

Figure 15:
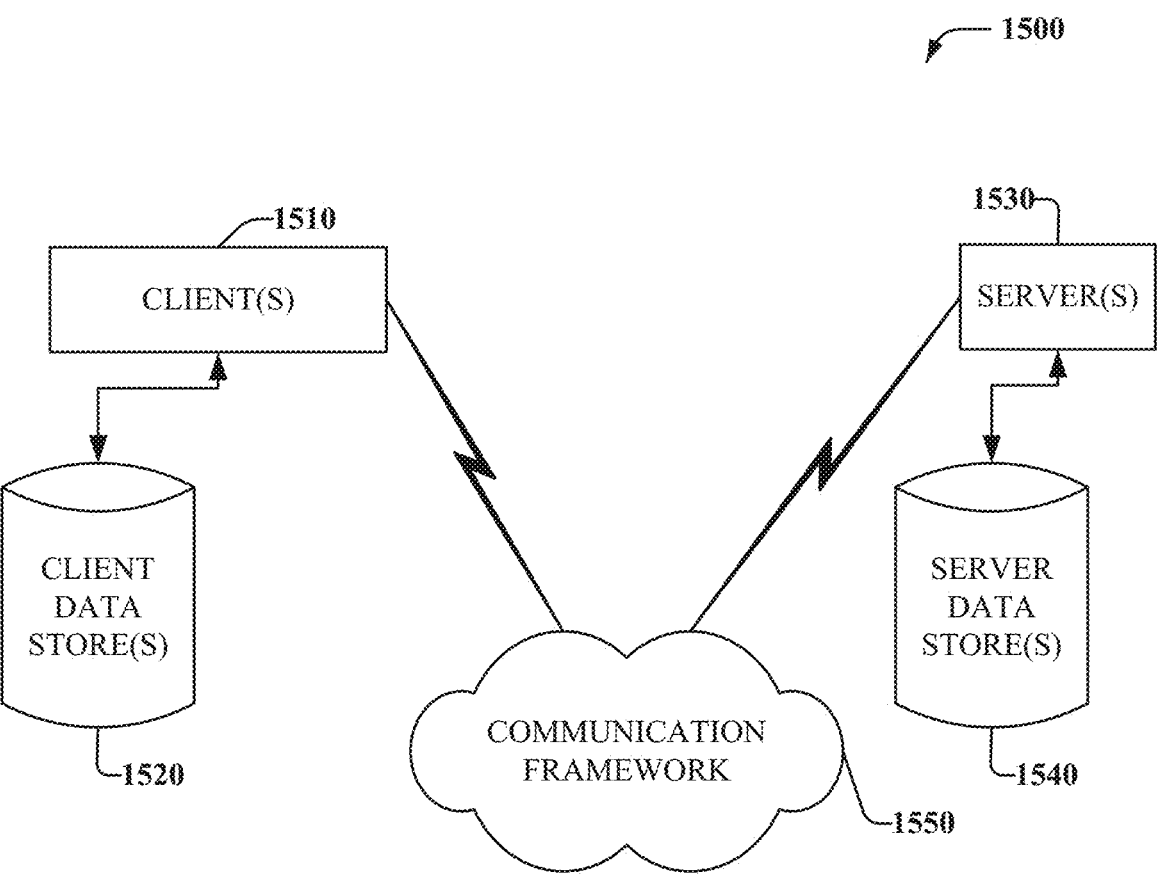
FIG. 15 illustrates an example networking environment operable to execute various implementations described herein.

FIG. 15 is a schematic block diagram of a sample computing environment 1500 with which the disclosed subject matter can interact. The sample computing environment 1500 includes one or more client(s) 1510. The client(s) 1510 can be hardware or software (e.g., threads, processes, computing devices). The sample computing environment 1500 also includes one or more server(s) 1530. The server(s) 1530 can also be hardware or software (e.g., threads, processes, computing devices). The servers 1530 can house threads to perform transformations by employing one or more embodiments as described herein, for example. One possible communication between a client 1510 and a server 1530 can be in the form of a data packet adapted to be transmitted between two or more computer processes. The sample computing environment 1500 includes a communication framework 1550 that can be employed to facilitate communications between the client(s) 1510 and the server(s) 1530. The client(s) 1510 are operably connected to one or more client data store(s) 1520 that can be employed to store information local to the client(s) 1510. Similarly, the server(s) 1530 are operably connected to one or more server data store(s) 1540 that can be employed to store information local to the servers 1530.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer-executable components; and a processor that executes the computer-executable components stored in the memory, wherein the computer-executable components comprise:

a training component that trains a discriminator of a generative adversarial network (GAN) to score a texture of a computed tomography (CT) image, wherein the texture is derived from a difference of two conditionally independent estimates produced by a generator of the GAN by respectively processing two independent noisy samples of images.

2. The system of claim 1, further comprising:

an input component that adds two different noise samples to the CT image to generate the two independent noisy samples of images, wherein the two independent noisy samples of images are conditionally independent.

3. The system of claim 1, wherein the discriminator scores the texture of the CT image against samples of a desired texture for the CT image during training, and wherein scoring the texture of the CT image comprises matching a distribution of noise in the texture with a desired noise.

4. The system of claim 1, wherein the training component trains the generator to produce a denoised CT image or a sharpened CT image based on scoring of the texture of the CT image by the discriminator.

5. The system of claim 1, wherein the training component uses an algorithm for training the discriminator and the generator of the GAN for stable convergence.

6. The system of claim 1, wherein the training component trains the GAN for denoising noisy CT images.

7. The system of claim 1, wherein the training component trains the GAN for deblurring noisy CT images.

8. The system of claim 1, further comprising:

a noise separation component that separates noisy texture from anatomy in the two conditionally independent estimates.

9. A computer-implemented method, comprising:

training, by a device operatively coupled to a processor, a discriminator of a GAN to score a texture of a CT image, wherein the texture is derived from a difference of two conditionally independent estimates produced by a generator of the GAN by respectively processing two independent noisy samples of images.

10. The computer-implemented method of claim 9, further comprising:

adding, by the device, two different noise samples to the CT image to generate the two independent noisy samples of images, wherein the two independent noisy samples of images are conditionally independent.

11. The computer-implemented method of claim 9, further comprising:

scoring, by the device, the texture of the CT image against samples of a desired texture for the CT image during training, wherein the scoring comprises matching a distribution of noise in the texture with a desired noise.

12. The computer-implemented method of claim 9, further comprising:

training, by the device, the generator to produce a denoised CT image or a sharpened CT image based on scoring of the texture of the CT image by the discriminator.

13. The computer-implemented method of claim 9, wherein the training comprises using an algorithm for training the discriminator and the generator of the GAN for stable convergence.

14. The computer-implemented method of claim 9, wherein the training further comprises training the GAN for denoising noisy CT images.

15. The computer-implemented method of claim 9, wherein the training further comprises training the GAN for deblurring noisy CT images.

16. The computer-implemented method of claim 9, further comprising:

separating, by the device, noisy texture from anatomy in the two conditionally independent estimates.

17. A computer program product for enhancing CT images using a texture matching GAN, the computer program product comprising a non-transitory computer readable memory having program instructions embodied therewith, the program instructions executable by a processor to cause the processor to:

train a discriminator of a GAN to score a texture of a CT image, wherein the texture is derived from a difference of two conditionally independent estimates produced by a generator of the GAN by respectively processing two independent noisy samples of images.

18. The computer program product of claim 17, wherein the program instructions are further executable by the processor to cause the processor to:

add two different noise samples to the CT image to generate the two independent noisy samples of images, wherein the two independent noisy samples of images are conditionally independent.

19. The computer program product of claim 17, wherein the program instructions are further executable by the processor to cause the processor to:

score the texture of the CT image against samples of a desired texture for the CT image during training, wherein scoring the texture of the CT image comprises matching a distribution of noise in the texture with a desired noise.

20. The computer program product of claim 17, wherein the program instructions are further executable by the processor to cause the processor to:

train the generator to produce a denoised CT image or a sharpened CT image based on scoring of the texture of the CT image by the discriminator.

\* \* \* \* \*